United States Patent
Harris et al.

(10) Patent No.: US 11,926,552 B2
(45) Date of Patent: Mar. 12, 2024

(54) LOW STORED TENSILE ENERGY DICING GLASS AND PREFERENTIAL CRACK FRAGMENTATION

(71) Applicant: CORNING INCORPORATED, Corning, NY (US)

(72) Inventors: Jason Thomas Harris, Horseheads, NY (US); Peter Joseph Lezzi, Corning, NY (US); Ross Johnson Stewart, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 378 days.

(21) Appl. No.: 17/294,912

(22) PCT Filed: Nov. 8, 2019

(86) PCT No.: PCT/US2019/060430
§ 371 (c)(1),
(2) Date: May 18, 2021

(87) PCT Pub. No.: WO2020/106471
PCT Pub. Date: May 28, 2020

(65) Prior Publication Data
US 2022/0017400 A1    Jan. 20, 2022

Related U.S. Application Data

(60) Provisional application No. 62/770,310, filed on Nov. 21, 2018.

(51) Int. Cl.
*C03B 27/04* (2006.01)
*B32B 17/06* (2006.01)
(Continued)

(52) U.S. Cl.
CPC .......... *C03B 27/0413* (2013.01); *B32B 17/06* (2013.01); *B32B 17/10005* (2021.01); *C03B 23/023* (2013.01); *C03B 27/0442* (2013.01)

(58) Field of Classification Search
CPC .............. B32B 17/06; B32B 17/10005; C03B 27/0413; C03B 27/0442; C03B 23/023
See application file for complete search history.

(56) References Cited

U.S. PATENT DOCUMENTS

| | | |
|---|---|---|
| 3,558,415 A | 1/1971 | Rieser et al. |
| 4,455,338 A | 6/1984 | Henne |
| (Continued) | | |

FOREIGN PATENT DOCUMENTS

| | | |
|---|---|---|
| AU | 6856000 A | 3/2001 |
| CN | 102566841 A | 7/2012 |
| (Continued) | | |

OTHER PUBLICATIONS

International Search Report and Written Opinion of the International Searching Authority; PCT/US19/60430; dated Mar. 13, 2020; 11 Pages; European Patent Office.
(Continued)

*Primary Examiner* — David Sample
*Assistant Examiner* — Donald M Flores, Jr.
(74) *Attorney, Agent, or Firm* — William M. Johnson; Payal A. Patel

(57) ABSTRACT

A glass substrate comprises: a first position, wherein a tensile stress of the glass substrate is insufficient to cause fragmentation of the glass substrate into small pieces upon fracture of the glass substrate; and a second position, wherein the glass substrate is bent relative to the first position, and wherein the tensile stress of the glass substrate is sufficient to cause fragmentation of the glass substrate into small pieces upon fracture of the glass substrate. The glass
(Continued)

substrate can include a first surface and a second surface. In the first position, the first surface and the second surface of the glass substrate can be planar. In the second position, the first surface and the second surface of the glass substrate can be planar. The small pieces can be generally cubic. In the second position, the glass substrate can be bent uniaxially along a bend axis of the glass substrate.

14 Claims, 23 Drawing Sheets

(51) Int. Cl.
  *B32B 17/10* (2006.01)
  *C03B 23/023* (2006.01)
  *C03B 27/044* (2006.01)

(56) References Cited

U.S. PATENT DOCUMENTS

| | | | |
|---|---|---|---|
| 4,899,507 A * | 2/1990 | Mairlot | B32B 17/10036 52/204.5 |
| 4,985,099 A | 1/1991 | Mertens et al. | |
| 6,086,983 A | 7/2000 | Yoshizawa | |
| 6,332,690 B1 | 12/2001 | Murofushi | |
| 6,582,799 B1 | 6/2003 | Brown et al. | |
| 7,375,782 B2 | 5/2008 | Yamazaki et al. | |
| 8,344,369 B2 | 1/2013 | Yamazaki et al. | |
| 8,549,885 B2 | 10/2013 | Dannoux et al. | |
| 8,833,106 B2 | 9/2014 | Dannoux et al. | |
| 8,912,447 B2 | 12/2014 | Leong et al. | |
| 9,061,934 B2 | 6/2015 | Bisson et al. | |
| 9,593,042 B2 | 3/2017 | Hu et al. | |
| 9,616,641 B2 | 4/2017 | Cleary et al. | |
| 9,802,485 B2 | 10/2017 | Masuda et al. | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 10,035,331 B2 | 7/2018 | Cleary et al. | |
| 10,131,118 B2 | 11/2018 | Kang et al. | |
| 2007/0223121 A1 | 9/2007 | Franck et al. | |
| 2009/0179840 A1 | 7/2009 | Tanaka et al. | |
| 2009/0185127 A1 | 7/2009 | Tanaka et al. | |
| 2010/0031590 A1 | 2/2010 | Buchwald et al. | |
| 2012/0202030 A1 | 8/2012 | Kondo et al. | |
| 2012/0328843 A1 | 12/2012 | Cleary et al. | |
| 2013/0088441 A1 | 4/2013 | Chung et al. | |
| 2014/0036428 A1 | 2/2014 | Seng et al. | |
| 2015/0246507 A1 | 9/2015 | Brown et al. | |
| 2016/0137548 A1 | 5/2016 | Cabral et al. | |
| 2016/0297176 A1 | 10/2016 | Rickerl | |
| 2016/0306451 A1 | 10/2016 | Isoda et al. | |
| 2016/0354996 A1 * | 12/2016 | Alder | B32B 17/10174 |
| 2016/0375808 A1 | 12/2016 | Etienne et al. | |
| 2017/0008377 A1 | 1/2017 | Fisher et al. | |
| 2017/0021661 A1 | 1/2017 | Pelucchi | |
| 2017/0197384 A1 | 7/2017 | Finkeldey et al. | |
| 2017/0197870 A1 | 7/2017 | Finkeldey et al. | |
| 2017/0327402 A1 | 11/2017 | Fujii et al. | |
| 2017/0349473 A1 | 12/2017 | Moriya et al. | |
| 2018/0050948 A1 | 2/2018 | Faik et al. | |
| 2018/0111569 A1 | 4/2018 | Faik et al. | |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0188869 A1 | 7/2018 | Boggs et al. | |
| 2018/0210118 A1 | 7/2018 | Gollier et al. | |
| 2018/0245125 A1 | 8/2018 | Tsai et al. | |
| 2019/0012032 A1 | 1/2019 | Brandao et al. | |
| 2019/0039935 A1 | 2/2019 | Couillard et al. | |
| 2019/0315648 A1 | 10/2019 | Kumar et al. | |
| 2020/0062632 A1 | 2/2020 | Brennan et al. | |
| 2020/0171952 A1 | 6/2020 | Couillard et al. | |

FOREIGN PATENT DOCUMENTS

| | | |
|---|---|---|
| CN | 103342477 A | 10/2013 |
| CN | 203825589 U | 9/2014 |
| CN | 104679341 A | 6/2015 |
| CN | 204463066 U | 7/2015 |
| CN | 104843976 A | 8/2015 |
| CN | 105511127 A | 4/2016 |
| DE | 4415878 A1 | 11/1995 |
| DE | 102004022008 A1 | 12/2004 |
| DE | 102013214108 A1 | 2/2015 |
| EP | 2110238 A1 | 10/2009 |
| EP | 3595895 A1 | 1/2020 |
| FR | 2918411 A1 | 1/2009 |
| GB | 2011316 A | 7/1979 |
| JP | 03-059337 B2 | 9/1991 |
| JP | 10-154804 A | 6/1998 |
| JP | 11-060293 A | 3/1999 |
| JP | 2003-500260 A | 1/2003 |
| JP | 2013-084269 A | 5/2013 |
| JP | 2015-092422 A | 5/2015 |
| JP | 5748082 B2 | 7/2015 |
| JP | 2016-031696 A | 3/2016 |
| JP | 5976561 B2 | 8/2016 |
| JP | 2016-173794 A | 9/2016 |
| JP | 2016-203609 A | 12/2016 |
| JP | 2016-207200 A | 12/2016 |
| KR | 10-2016-0144008 A | 12/2016 |
| WO | 98/01649 A1 | 1/1998 |
| WO | 2000/073062 A1 | 12/2000 |
| WO | 2007/108861 A1 | 9/2007 |
| WO | 2012/058084 A2 | 5/2012 |
| WO | 2014/175371 A1 | 10/2014 |
| WO | 2015/031594 A2 | 3/2015 |
| WO | 2016/044360 A1 | 3/2016 |
| WO | 2016/125713 A1 | 8/2016 |
| WO | 2016/136758 A1 | 9/2016 |
| WO | 2016/196531 A1 | 12/2016 |
| WO | 2016/196546 A1 | 12/2016 |
| WO | 2017/155932 A1 | 9/2017 |
| WO | 2018/005646 A1 | 1/2018 |
| WO | 2018/009504 A1 | 1/2018 |
| WO | 2018/075853 A1 | 4/2018 |
| WO | 2018/081068 A1 | 5/2018 |
| WO | 2018/125683 A1 | 7/2018 |
| WO | 2018/200807 A1 | 11/2018 |
| WO | 2019/010401 A1 | 1/2019 |

OTHER PUBLICATIONS

Chinese Patent Application No. 201980083292.0, Office Action dated Sep. 5, 2022, 4 pages (English Translation only), Chinese Patent Office.
Barsom, J.M.; "Fracture of Tempered Glass;" J. Am. Ceram. Soc., vol. 51, No. 2; 1968.
Gulati, S. "Frangibility of Tempered Soda-Lime Glass Sheet", Glass Processing Days, Sep. 13-15, 1997.
International Search Report and Written Opinion of the International Searching Authority; PCT/US2018/012215 dated Aug. 1, 2018; 21 Pgs; European Patent Office.
International Search Report and Written Opinion of the International Searching Authority; PCT/US2018/041062 dated Nov. 13, 2018; 15 Pgs; European Patent Office.
Invitation To Pay Additional Fees of the International Searching Authority; PCT/US2018/012215; dated May 11, 2018; 13 Pages; European Patent Office.
ISR and Written Opinion PCT/US2019/06043.

* cited by examiner

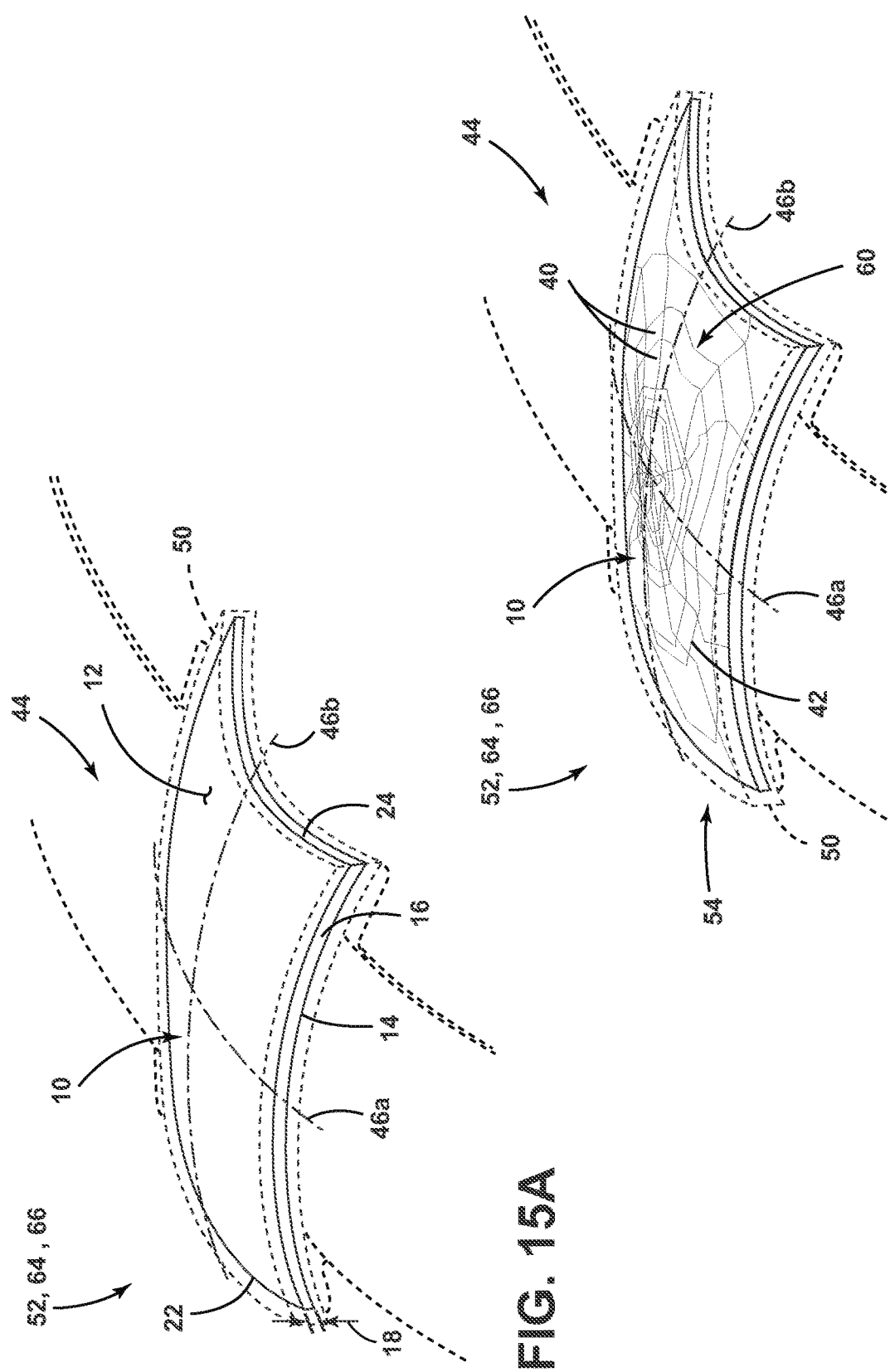

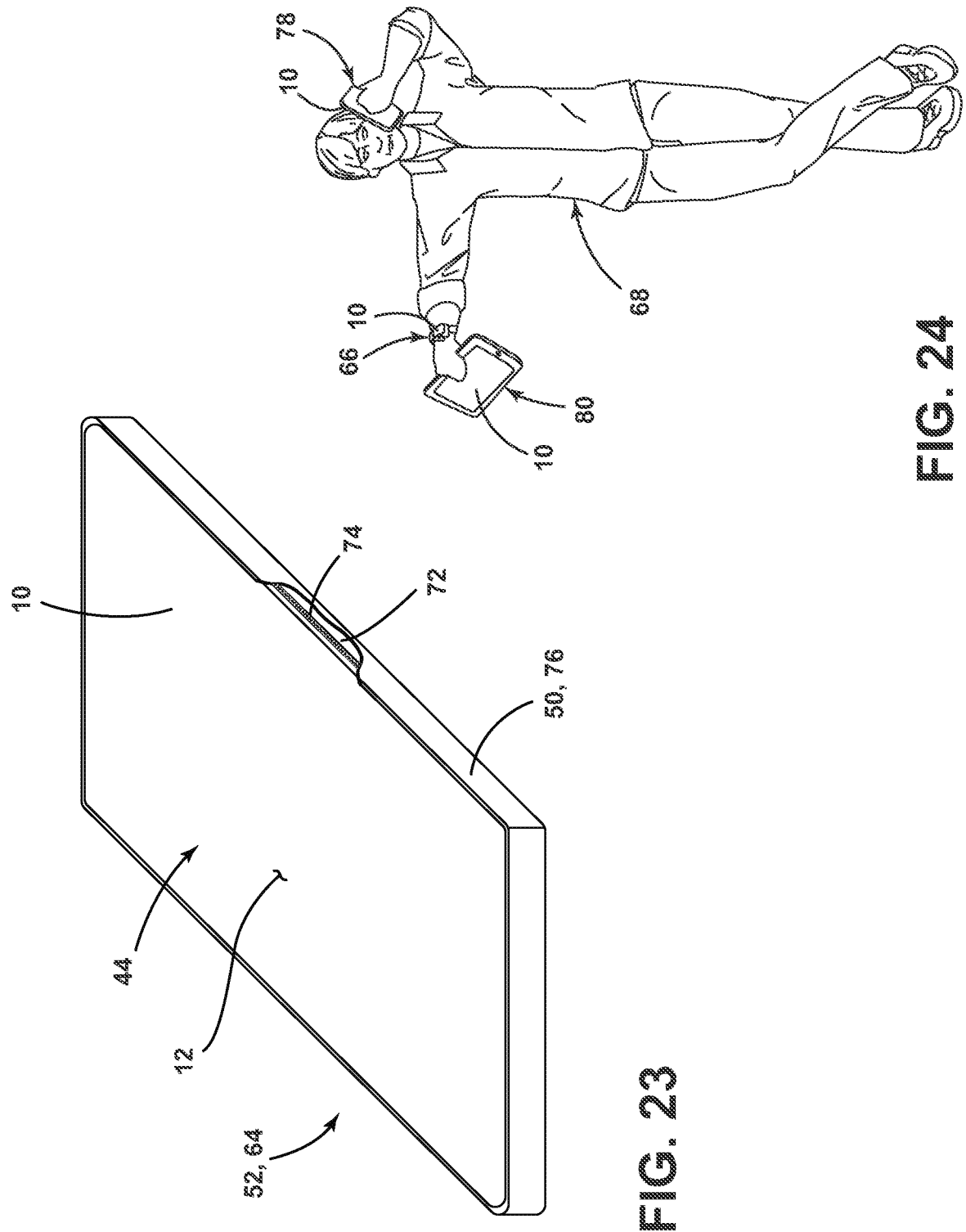

LOW STORED TENSILE ENERGY DICING GLASS AND PREFERENTIAL CRACK FRAGMENTATION

CROSS-REFERENCE TO RELATED APPLICATIONS

This application is a national stage application under 35 U.S.C. § 371 of International Application No. PCT/US2019/060430, filed on Nov. 8, 2019, which claims the benefit of priority under 35 U.S.C. § 119 of U.S. Provisional Application Ser. No. 62/770,310 filed on Nov. 21, 2018 the content of which is relied upon and incorporated herein by reference in its entirety.

BACKGROUND

This disclosure generally pertains to a glass substrate, including strengthening the glass substrate. More particularly, the disclosure pertains to a glass substrate having insufficient tensile stress in the natural state of the glass substrate to cause a desired degree of fragmentation (such as dicing) upon fracture of the glass substrate but, upon application of a bending force upon the glass substrate, having sufficient tensile energy to cause the desired degree of fragmentation upon said fracture.

The mechanical strength of a virgin glass substrate is in the MPa range because of surface flaws. That level of mechanical strength is sub-optimal. The sub-optimal mechanical strength of virgin glass substrate renders virgin glass inadequate for application as displays and cover glass for consumer electronic devices such as televisions, telephones, and entertainment devices.

To be adequate for use in such applications, virgin glass substrate is sometimes mechanically strengthened and thus more wear resistant. The virgin glass substrate is mechanically strengthened through a process that creates a layer at the surface of the glass that is under compression. That layer is sometimes referred to as a "compressive stress layer" or a surface layer having "compressive stress."

Stress in a central region of the glass substrate force balances the compressive stresses in the compressive stress layers. In particular, the interior of the glass substrate is under tensile stress. The tensile stress of the interior of the glass substrate force balances the compressive stress of the compressive stress layers of the glass. In conceptual terms, the interior of the glass is trying to pull itself together (tensile stress) while each of the surface layers of the glass is trying to push itself apart.

The compressive stress at the surface layers of the glass substrate mechanically strengthens the glass substrate and thereby reduces the likelihood of fracture of the glass substrate (nucleation of cracks or other flaws) as well as the growth of the fracture. The higher the degree of compressive stress, the greater the mechanically strength of the glass substrate. The depth of the compressive stress layers also affects the degree of mechanical strengthening, with the degree of mechanical strengthening increasing with deeper compressive stress layers. Thus, it is advantageous for mechanical strength purposes to have a relatively high degree of compressive stress and relatively deep depth of compression (or compressive stress). In general, a high degree of compressive stress reduces the nucleation and growth of shallow scratches, while a deep depth of compression helps with drop-test performance and prevents interior fractures from breaking through to the surface.

There are several common processes to impart compressive stresses to the surfaces of virgin glass substrate. One of the processes uses heat and is referred to as "thermal tempering." Another of the processes utilizes chemistry and is referred to as "ion exchange" or "chemical tempering." In addition, the glass substrate may be incorporated as a glass-laminate, which includes several different glasses, each having a different coefficient of thermal expansion, and the difference in the coefficient of thermal expansion creates compressive stress at a surface layer of the glass substrate.

As mentioned, thermal tempering the glass can induce a layer compressive stress at the surfaces of the glass substrate. To thermally temper the glass substrate, the glass substrate is heated to above the transition temperature of the glass. The heated glass substrate is then rapidly cooled ("quenched"). During cooling, the surfaces of the glass substrate cool (decrease in temperature) more quickly than the interior of the glass substrate. The interior of the glass substrate cools slower than the surfaces of the glass substrate because the thickness of the glass substrate insulates the interior and glass has a relatively low thermal conductivity. The surfaces of the glass substrate that cool more rapidly than the interior have a greater molar/specific volume (or less density) than the more slowly cooled interior. Thus a gradient in molar volume is created from the surface of the glass substrate into the interior of the glass substrate. The gradient in molar volume provides compressively stressed surface layers, and the compressive stress decreases from the surface towards the interior.

Thermal tempering of glass is typically faster and less expensive than an ion-exchange process. Thermal tempering results in deeper compressive stresses than an ion-exchange process, typically extending from ⅕ to ⅓ of the thickness of the glass. However, thermal tempering generally results in lower surface compressive stress than an ion-exchange process, typically resulting in compressive stress of less than 100 MPa.

Because thermal tempering relies on the creation of a sufficient thermal gradient between the surface layers and in the interior, the glass substrate must be sufficiently thick to allow for a sufficient thermal gradient. Thermal tempering is thus utilized to strengthen relatively thick (3 mm or thicker) and monolithic sheets of glass substrate, such as those used as side and rear window panes in automobiles. Thermal tempering is typically ineffective for the glass substrate with a thickness of 2 mm or less, such as a glass substrate intended to be used in consumer electronic device display applications.

In addition to thermal tempering, as mentioned above, chemical tempering (ion-exchange) the glass substrate can induce a layer compressive stress at the surfaces of the glass substrate. As an example chemical tempering process, the glass substrate is placed in a molten salt bath, such as a bath of salt or salts of alkali metal ions. The glass substrate contains ions that are exchangeable with the metal ions in the molten salt bath. The ions in the glass substrate that will leave the glass substrate are smaller (such as $Na^+$ ions or $Li^+$ ions) than the ions in the molten salt bath (such as $K^+$ ions in a bath of molten $KNO_3$; $Rb^+$, $Cs^+$, and $Ag^+$ ions are other example ions) that will enter the glass substrate. The glass substrate exchanging relatively small ions for relatively large ions results in a bi-axial (x and y axes) compressive stress where the ions were exchanged.

The ion-exchange typically occurs below the glass transition temperature of the glass substrate. In addition, the temperature should be below a temperature where the glass substrate releases ions to reduce the resulting compressive stress that the exchanged-for larger ions induced (a phenomenon referred to as stress relaxation). Suitable temperatures may be in a range of from about 250° C. to about 500° C. The ion-exchange process might take from between 4 hours and 11 hours, depending on the magnitude of compressive stress and depth of compressive stress layer desired.

Chemical tempering through ion-exchange can create much higher levels of compressive stress (as high as about 1000 MPa) than thermal tempering. In addition, chemical tempering results in limited depth of the layers of compressive stress (40-80 μm is typical) compared to thermal tempering. However, the limited depth renders chemical tempering more suitable for relatively thin glass (2 mm or less) than thermal tempering. Chemical tempering is utilized to render the glass substrate mechanically strong enough for applications including aircraft windowpanes and scratch resistant displays for consumer electronic devices.

In one or more embodiments, the glass substrate may be tempered mechanically by utilizing a mismatch of the coefficient of thermal expansion between portions of the glass substrate to create a compressive stress region and a central region exhibiting a tensile stress.

The residual stress profile—that is, the balance between the surface compressive stresses and the interior tensile stress—resulting from the thermal, chemical or mechanical tempering process imparted on the glass substrate affects how the glass substrate reacts upon fracture of the glass substrate. How the glass substrate reacts upon fracture of the glass substrate is a design consideration related to the application for which the glass substrate is used. In general, the glass substrate should react in a safe and controlled manner upon fracture of the glass substrate.

The manner in which the glass substrate reacts upon fracture includes the fragmentation behavior of the glass substrate after fracture. Heretofore, the fragmentation behavior of the glass was a function of the tensile energy in the tempered glass substrate. One potentially desirable fragmentation behavior is for a fracture in the glass substrate not to bifurcate—that is, one fracture does not split into two separate fractures. The more stored tensile energy in the glass substrate, the more likely a fracture in the glass substrate will bifurcate. Thus, to reduce the likelihood of bifurcation, the glass substrate can be tempered such that the tensile energy is relatively low or otherwise insufficient to cause such a bifurcation. As discussed, the tensile stress attempts to pull the glass substrate together. Therefore, this tensile stress, if sufficiently energetic, pulls the surface of the glass substrate inward, bifurcating a fracture developing in the surface layer. However, the direction in which the fracture propagates is unpredictable.

Another potentially desirable fragmentation behavior is for the glass substrate to fragment into small pieces (sometimes referred to as "dicing" or 'the glass "dices"'). It may be preferable to have the width and length of the fragmented pieces to be approximately equal to the thickness of the glass substrate. The result is cubic pieces with corners angled at 90 degrees. Pieces with corners of approximately 90 degrees are not considered to be sharp and thus unlikely to cause injury. For the glass substrate to dice in such a manner upon fracture, the tempered glass substrate must have sufficient stored tensile energy.

Potentially undesirable fragmentation behaviors include fragmentation of the glass substrate upon fracture into (a) long, sharp pieces or (b) powder. If the tensile stress in the tempered glass is sufficient to cause bifurcation of the glass substrate upon fracture but insufficient to cause fragmentation of the glass into small pieces, then the tensile stress can cause the glass substrate to divide into large and/or elongated fragments. Large and/or elongated fragments tend to have sharp edges, which are unsafe. In addition, if the tensile stress in the tempered glass substrate is greater than the tensile stress that causes the glass substrate to dice, then the tensile stress causes the glass substrate to powderize upon fracture of the glass substrate. A powdered glass substrate is also unsafe.

Therefore, there exists a problem in that glass substrate tempered pursuant to a specific tempering process might not have sufficient tensile stress to cause the glass substrate to fragment into sufficiently small pieces (such as dicing), which limits the potential applications for the glass substrate (that is, the glass could not be used for applications that require fragmentation into small pieces). This problem is especially prevalent in a relatively thin glass substrate (less than 1 mm thick), because such a thin glass substrate is too thin for thermal tempering and even too thin for chemical tempering to impart enough stored tensile stress to cause fragmentation of the glass substrate into small pieces upon fracture. In addition, there therefore exists another problem in that the direction of cracks, bifurcations, and fragmentation in general is unpredictable and uncontrollable. Finally, there therefore exists another problem in that thermal tempering imparts insufficient compressive stress to the surfaces of the glass substrate for the glass substrate to be useful in some applications.

SUMMARY

The present disclosure overcomes the above noted problems by bending the glass to impart additional tensile stress and compressive stress to certain regions of the glass substrate. Such bending may be dynamically applied or may be applied in a static manner. In one or more embodiments, the glass is bent by cold-bending. The tensile stress that bending the glass substrate imparts to the glass substrate works in conjunction with the stored tensile stress of the tempered glass substrate to cause the glass substrate to fragment into small pieces upon fracture. Imparting the tensile stress through bending allows the tempered glass substrate, which otherwise lacks sufficient tensile stress to cause the glass substrate to fragment into small pieces upon fracture, to be used for applications that require the glass substrate to fragment into small pieces upon fracture. The impartation of tensile stress via bending is especially useful for relatively thin glass (less than 1 mm thick), where, as mentioned, the glass substrate is too thin for tempering processes to impart sufficient tensile stress to cause the glass substrate to fragment into small pieces. In addition, uniaxial bending of the glass substrate, as will be shown, imparts directional tensile stress that directs the fracture of the glass substrate in a direction parallel to the axis of the uniaxial bend. Urging the propagation of the fracture in a particular direction is useful in particular for consumer electronic devices having a display using the glass substrate, so that the fracture is directed to the sides of the device rather than upwards or downwards along the length of the device. Further, as will be explained, bending of the glass substrate adds compressive stress to the compressive stress at a surface layer of the glass substrate already imparted to the glass substrate via tempering. The additional compressive stress added, via bending, to the layer of compressive stress induced via tempering can render the glass substrate useful for applications requiring a certain threshold compressive stress at a particular surface layer but tempering alone could not impart the threshold compressive stress.

According to a first aspect of the present disclosure, a glass substrate comprises: a first position, wherein a tensile stress of the glass substrate is insufficient to cause fragmentation of the glass substrate into small pieces upon fracture of the glass substrate; and a second position, wherein the glass substrate is bent relative to the first position, and wherein the tensile stress of the glass substrate is sufficient to cause fragmentation of the glass substrate into small pieces upon fracture of the glass substrate. In an embodiment, the glass substrate further comprises a first surface and a second surface. In an embodiment, in the first position, the first surface and the second surface of the glass substrate are planar. In an embodiment, in the second position, the first surface and the second surface of the glass substrate are planar. In an embodiment, the small pieces are generally cubic shaped. In an embodiment, in the second position, the glass substrate is bent uniaxially along a bend axis of the glass substrate. In an embodiment, in the second position, the glass substrate is bent biaxially along two bend axes of the glass substrate. In an embodiment, in the first position, the glass substrate is flatter than the glass substrate is in the second position. In an embodiment, in the second position, the glass substrate is flatter than the glass substrate is in the first position. In an embodiment, the glass substrate has a thickness of 2 mm or less.

According to a second aspect of the present disclosure, a method of increasing compressive stress at a layer of a glass substrate comprises: providing or forming a glass substrate; imparting a first compressive stress within a first layer from a first surface, and within a second layer from a second surface of the glass substrate; and bending the glass substrate along an axis of the glass substrate to add compressive stress to the first compressive stress within the second layer. In an embodiment, imparting the first compressive stress within the first layer and the second layer of the glass substrate includes thermal tempering of the glass substrate. In an embodiment, imparting the first compressive stress within the first layer and within the second layer of the glass substrate includes chemical tempering of the glass substrate. In an embodiment, imparting the first compressive stress within the first layer and within the second layer of the glass substrate includes mechanical tempering of the glass substrate. In an embodiment, the second surface of the glass substrate is a top surface of the glass substrate.

According to a third aspect of the present disclosure, a method of reducing the size of the pieces that a glass substrate fragments into upon fracture of the glass substrate comprises: providing or forming a glass substrate that fragments into pieces having a first size upon fracture of the glass substrate; and bending the glass substrate to a second position and maintaining the glass substrate in the second position, such that when the glass substrate fragments into pieces having a second size upon fracture of the glass substrate; wherein, the pieces having the second size are smaller than the pieces having the first size. In an embodiment, forming the glass substrate includes forming the glass substrate with a thickness of 2 mm or less. In an embodiment, bending the glass substrate includes biaxial bending of the glass substrate. In an embodiment, when the glass substrate fragments, in the second position, upon fracture of the glass substrate, the pieces form an in-plane isotropic fracture pattern. In an embodiment, bending the glass substrate includes uniaxial bending of the glass substrate along a bend axis of the glass substrate. In an embodiment, forming the glass substrate includes forming the glass substrate with a first surface that is flat. In an embodiment, forming the glass substrate includes forming the glass substrate with a first surface that is curved. In an embodiment, bending the glass substrate to the second position includes bending the glass substrate so that the first surface is less curved in the second position than in the first position. In an embodiment, bending and maintaining the glass substrate in the second position is achieved at ambient temperature by a structural component of a product that utilizes the glass substrate.

According to a fourth aspect of the present disclosure, a product comprises: a glass substrate having a first position, wherein the tensile energy of the glass substrate is insufficient to cause fragmentation of the glass substrate into small pieces upon fracture of the glass substrate; and a component that bends the glass substrate away from its first position to an second position, wherein the tensile energy of the glass substrate is sufficient to cause fragmentation of the glass substrate into small pieces upon fracture of the glass substrate. In an embodiment, the product is a consumer electronic device that is configured to be worn on a wrist of a person. In an embodiment, the product is safety glass. In an embodiment, the glass substrate has a first surface and a second surface. In an embodiment, in the second position, the first surface has a higher compressive stress than the second surface.

According to a fifth aspect of the disclosure, a consumer electronic device comprises: a glass substrate disposed over a display screen, the glass substrate having a length, and a width extending from a first side to a second side; and a component that bends the glass substrate along a bend axis from a first position to a second position bent relative to the first position, such that upon fracture of the glass substrate in the second position, the fracture propagates generally toward the first side or the second side of the glass substrate; wherein, the bend axis is generally parallel to the width of the glass substrate. In an embodiment, in the first position, the glass substrate has a first layer of compressive stress extending from a first surface. In an embodiment, the component that bends the glass substrate to the second position increases the compressive stress within the first layer. In an embodiment, the component that bends the glass substrate compresses the glass substrate from the first position to the second position. In an embodiment, the component that bends the glass substrate is an adhesive layer. In an embodiment, the consumer electronic device is a smart phone, tablet, or a watch.

Additional features and advantages will be set forth in the detailed description which follows, and in part will be readily apparent to those skilled in the art from that description or recognized by practicing the embodiments as described herein, including the detailed description and the claims, which follow.

It is to be understood that both the foregoing general description and the following detailed description are merely exemplary, and are intended to provide an overview or framework to understanding the nature and character of the claims.

BRIEF DESCRIPTION OF THE DRAWINGS

FIG. 15A a perspective view of a product (a watch) incorporating the glass substrate of FIG. 14A, illustrating the glass substrate having been biaxially bent to a second position along a first bend axis and a second bend axis such that the first surface and the second surface are curved, and a component of the product maintaining the glass substrate in the second position;

FIG. 15B is a perspective view of the product of FIG. 15A incorporating the glass substrate of FIG. 14A, illustrating the glass substrate fragmenting into pieces of a second size (small pieces) due to the additional tensile stress imparted to regions of the glass substrate via bending the glass substrate to the second position;

FIG. 23 is a perspective view of the consumer electronic device of FIG. 22, with a portion of a backing plate cut away to show the adhesive layer maintaining the glass substrate in a second position (bent);

FIG. 24 illustrates a person holding a variety of consumer electronic devices that incorporate the glass substrate of FIG. 1 in the second position (bent) of FIG. 5, such as the watch of FIG. 15A, a tablet, and a smart phone.

DETAILED DESCRIPTION

Figure 1:
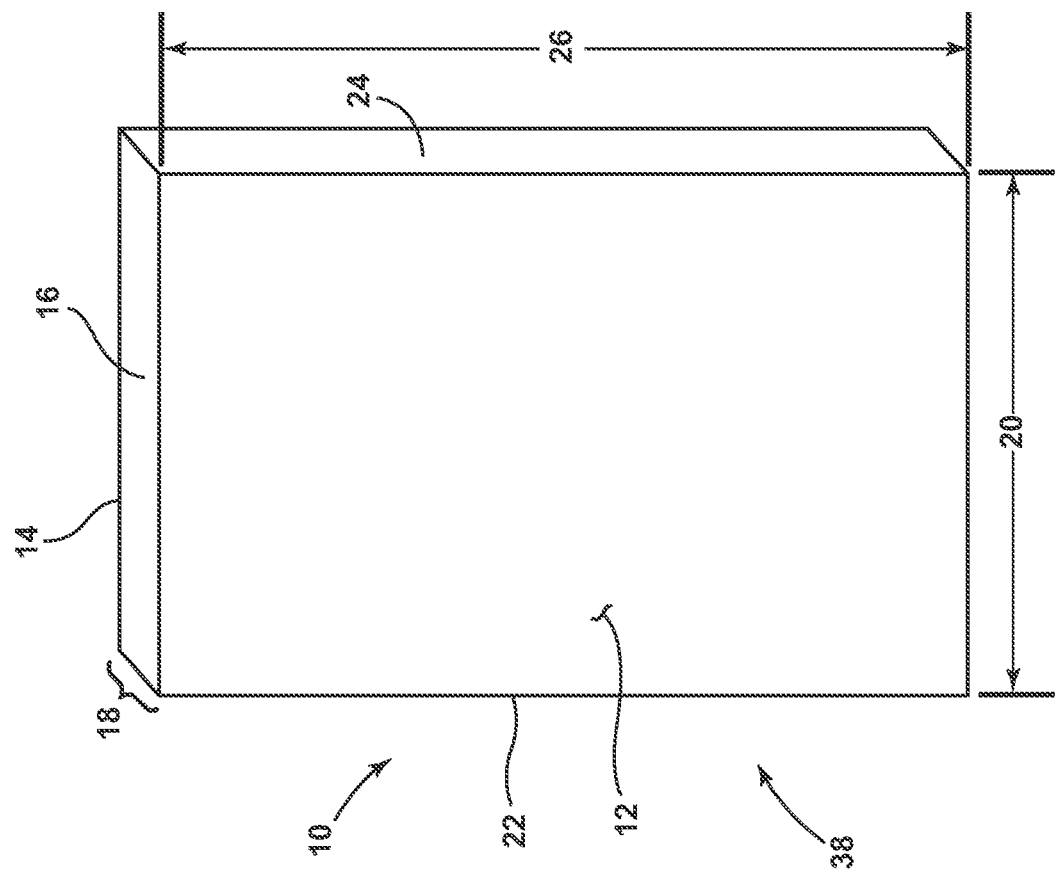
FIG. 1 is a perspective view of a glass substrate in a first position, the glass substrate having a thickness defined by the distance between a first surface and a second surface, a width extending from a first side to a second side, and a width.
Figure 2:
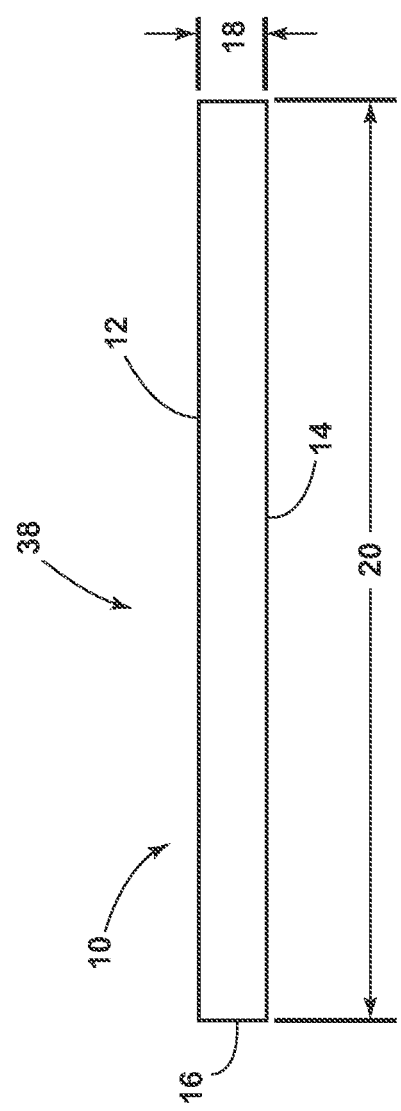
FIG. 2 is an elevational view of the glass substrate of FIG. 1.

Referring now to FIGS. 1 and 2, a glass substrate 10 includes a first surface 12 and a second surface 14. The first surface 12 and the second surface 14 are the major surfaces of the glass substrate 10—that is, surfaces of the glass substrate 10 having the greatest surface area. A side surface 16 connects the first surface 12 and the second surface 14. The glass substrate 10 has a thickness 18 and is defined as the maximum distance between the first surface 12 and the second surface 14. In the illustrated embodiment, the glass substrate 10 has a thickness 18 that is substantially constant. The glass substrate 10 has a width 20 defined as a first maximum dimension of one of the first surface 12 or the second surface 14 orthogonal to the thickness 18. In the illustrated embodiment, the width 20 is thus the distance between a first side 22 of the glass substrate 10 and a second side 24 along the first surface 12. The glass substrate 10 has a length 26 defined as a second maximum dimension of one of the first surface 12 or the second surface 14 orthogonal to both the thickness 18 and the width 20.

As used herein, the term "glass substrate" 10 is used in its broadest sense to include any object made wholly or partly of glass. Glass substrates 10 include laminates of glass and non-glass materials, laminates of glass and crystalline materials, and glass-ceramics (including an amorphous phase and a crystalline phase). The glass substrate 10 may be transparent or opaque. In one or more embodiments, the glass substrate 10 may include a colorant that provides a specific color. Suitable glass compositions to form the glass substrate 10 include soda lime glass compositions, aluminosilicate glass compositions, borosilicate glass compositions, boroaluminosilicate glass compositions, alkali-containing aluminosilicate glass compositions, alkali-containing borcleosilicate glass compositions, and alkali-containing boroaluminosilicate glass compositions.

Unless otherwise specified, the compositions of the glass substrates 10 disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass substrate 10 is described as an aluminosilicate glass substrate or including an aluminosilicate glass composition. In such embodiments, the glass composition or substrate formed therefrom includes $SiO_2$ and $Al_2O_3$ and is not a soda lime silicate glass. In this regard, the glass composition or substrate formed therefrom includes $Al_2O_3$ in an amount of about 2 mol % or greater, about 2.25 mol % or greater, about 2.5 mol % or greater, about 2.75 mol % or greater, or about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$, and $K_2O$ only. In one or more embodiments, the glass composition may comprise at least one alkali metal oxide selected from $Li_2O$, $Na_2O$, and $K_2O$, wherein the alkali metal oxide is present in an amount greater than about 8 mol %.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO, and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, or less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass substrate 10. In some embodiments, the glass composition includes an oxide that prevents discoloration of the glass substrate 10 when the glass substrate 10 is exposed to ultraviolet radiation. Examples of such oxides include, without limitation, oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, or less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less, or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

The glass composition chosen can be formed into the glass substrate 10 using any method capable of producing the glass substrate 10 that can be tempered. Example methods capable of producing the glass substrate 10 include down-draw methods that form sheets of the glass substrate 10. Down-draw methods include, but are not limited to, fusion draw and slot draw methods. Down-draw methods are used in the large-scale manufacture of flat glass substrates 10, such as display glass and ion-exchangeable glass (capable of being chemical tempered). The fusion draw method uses a forming body that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the isopipe. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact. The glass substrate 10 is formed initially without a layer of compressive stress at the first surface 12 and the second surface 14.

Figure 3:
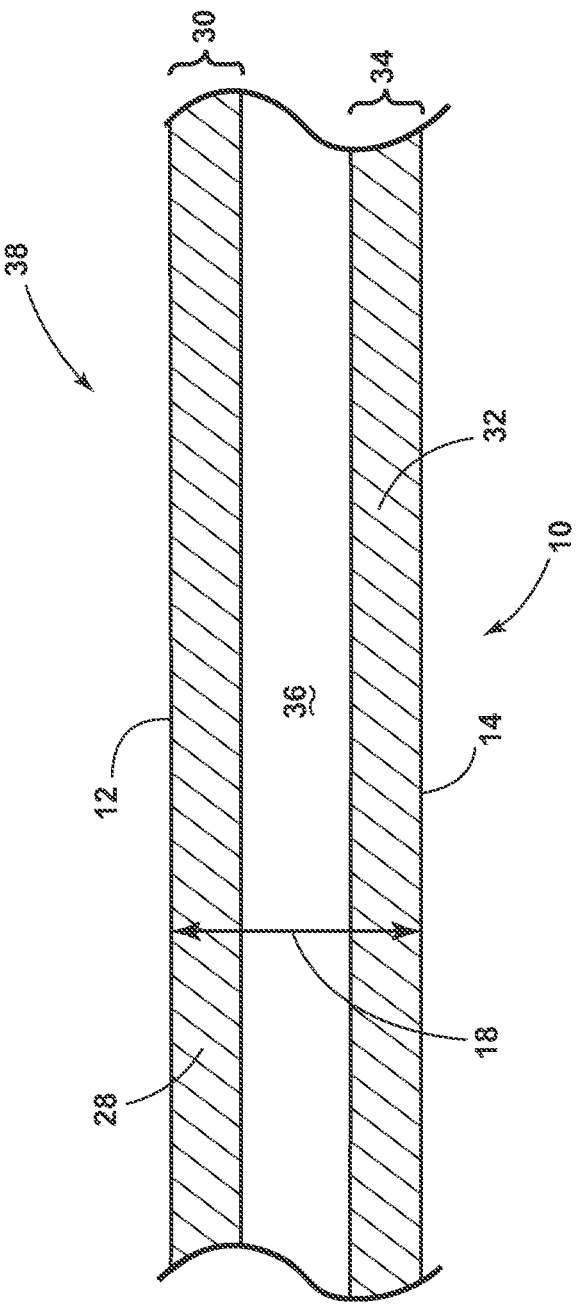
FIG. 3 is a close up schematic view of the glass substrate of FIG. 1, illustrating a central region of tensile stress between a first layer and a second layer of compressive stress, the tensile stress and compressive stress imparted via tempering.

Referring now to FIG. 3, the glass substrate 10 is then tempered, either chemically tempered, thermally tempered, or both, or otherwise tempered. After such tempering, the glass substrate 10 has compressive stress imparted to the first surface 12 and extending through a first layer 28 of the thickness 18 referred to as a depth of compression (DOC) 30. The tempering additionally imparts compressive stress to the second surface 14 and extending through a second layer 32 of the thickness 18 referred to as a depth of compression (DOC) 34. The tempering further imparts tensile stress within a central region 36 between the first layer 28 and the second layer 32. This tensile stress is sometimes referred to as "central tension." The tensile stress within the central region 36 balances the compressive stress within the first layer 28 and the second layer 32.

In FIGS. 1-3, the glass substrate 10 is illustrated in an embodiment of a first position 38. In this embodiment of the first position 38, the first surface 12 and the second surface 14 of the glass substrate 10 are planar. In other words, the first surface 12 and the second surface 14 are flat. However, as discussed further below, the first surface 12 and the second surface 14 need not be flat in the first position 38.

Figure 4:
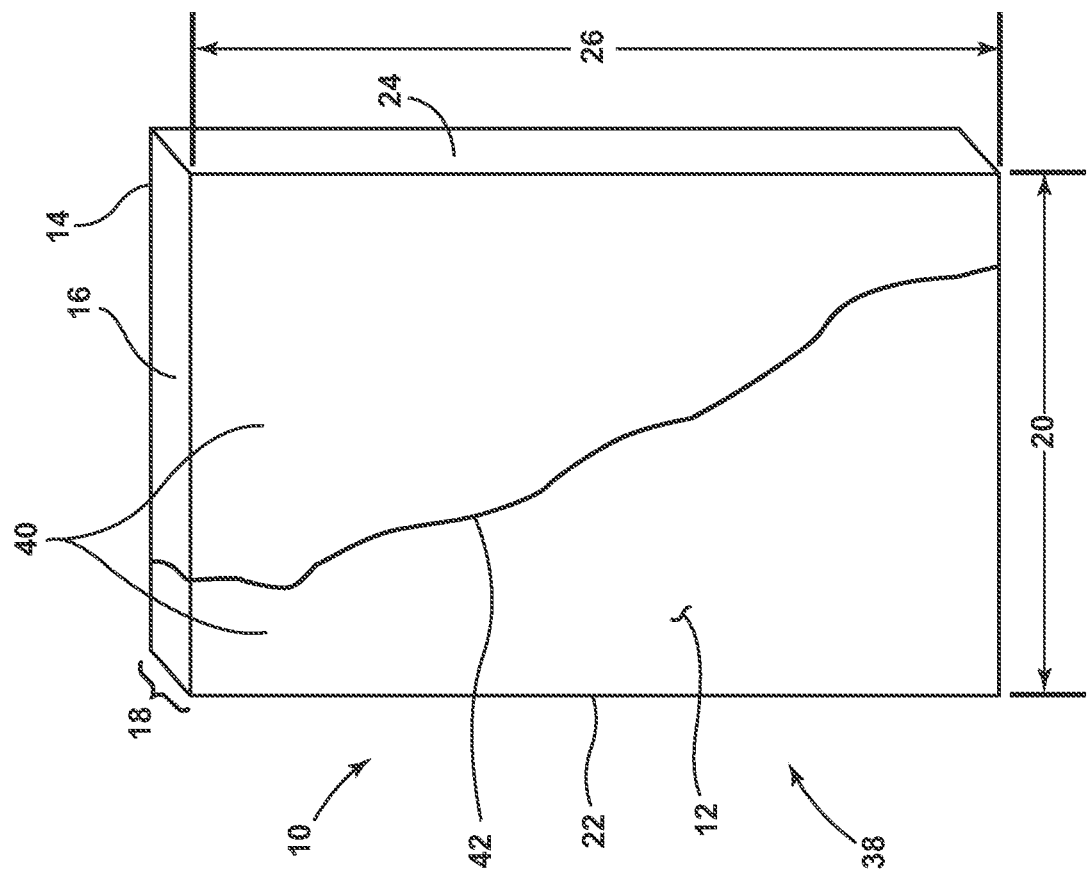
FIG. 4 is a perspective view of the glass substrate of FIG. 1, illustrating a fracture in the glass substrate extending the length of the glass substrate, and illustrating the glass substrate not fragmenting into small pieces as a result of the fracture.

Referring now to FIG. 4, this disclosure assumes that the tempering of the glass substrate 10 results in tensile energy at the central region 36 of the glass substrate 10 that is insufficient, when the glass substrate 10 is in the first position 38, to cause fragmentation of the glass substrate 10 into pieces 40 having a sufficiently small size upon fracture 42 of the glass substrate 10 for the desired application of the glass substrate 10. In other words, when the glass substrate 10 fractures 42, the glass substrate 10 fragments into pieces 40 that are large (having a large surface area) upon fracture 42, compared to the surface area (length 26×width 20) of the glass substrate 10 before fracture 42. The tensile stress was too small.

Figure 5:
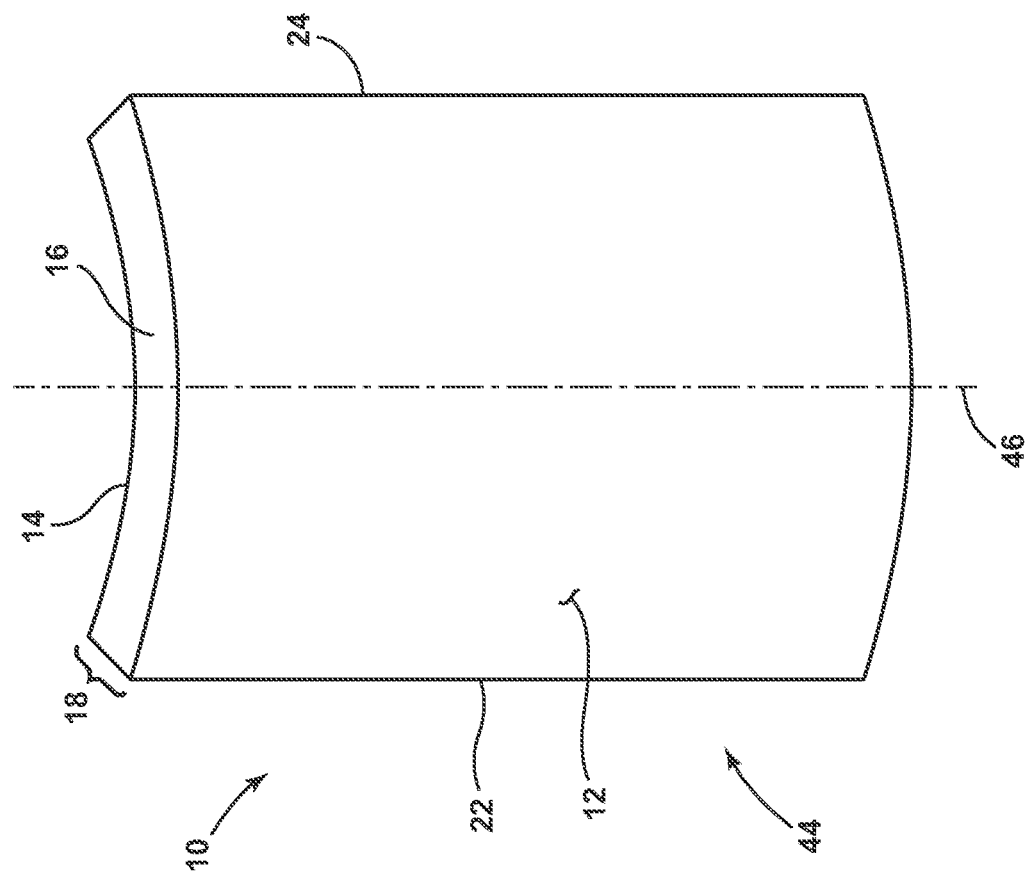
FIG. 5 is a perspective view of the glass substrate of FIG. 1 having been bent from the first position of FIG. 1 to a second position along a bend axis.

Referring now to FIG. 5, the glass substrate 10 is in a second position 44. In the second position 44, the glass substrate 10 is bent relative to the first position 38. Because the first surface 12 and the second surface 14 of the glass substrate 10 in the first position 38 (FIG. 1) were planar (that is, flat), the first surface 12 and the second surface 14 of the glass substrate 10 in the second position 44 are not planar (that is, not flat—the first surface 12 and the second surface 14 now being curved). In the illustrated embodiment, the glass substrate 10 is flatter in the first position 38 than in the second position 44. In the illustrated embodiment, the glass substrate 10 is bent uniaxially along a bend axis 46 of the glass substrate 10.

In one or more embodiments, the glass substrate 10 is bent uniaxially along the bend axis 46 by cold-bending. As used herein, the terms "cold-bent," or "cold-bending" refers to curving the glass substrate at a cold-bend temperature which is less than the softening point of the glass. Often, the cold-bend temperature is room temperature. The term "cold-bendable" refers to the capability of a glass substrate to be cold-bent. A feature of a cold-bent glass substrate is asymmetric surface compressive stress between the first surface 12 and the second surface 14 (as shown in FIG. 5). In one or more embodiments, prior to the cold-bending process or being cold-bent, the respective compressive stresses in the first surface 12 and the second surface 14 of the glass substrate are substantially equal. In one or more embodiments in which the glass substrate is unstrengthened, the first surface 12 and the second surface 14 exhibit no appreciable compressive stress, prior to cold-bending. In one or more embodiments in which the glass substrate is strengthened (as described herein), the first surface 12 and the second surface 14 exhibit substantially equal compressive stress with respect to one another, prior to cold-bending. In one or more embodiments, after cold-bending, the CS on the surface having a concave shape after cold-bending (e.g., second surface 14) increases, while the CS on the surface having a convex shape after cold-bending (e.g., the first surface 12) decreases. In other words, the compressive stress on the concave surface (e.g., second surface 14) is greater after cold-bending than before cold-bending.

The bending of the glass substrate 10 affects the stress profile of the glass substrate 10 (the distribution of compressive stress and tensile stress throughout the glass substrate 10) that the glass substrate 10 has after tempering, as will be discussed. In particular, because the bending forms a uniaxial bend in the direction towards the second surface 14, the bending adds to the compressive stress at the second layer 32 and subtracts from the compressive stress at the first layer 28. In addition, by affecting the stress profile of the tempered glass substrate 10, the bending affects the degree of fragmentation (more pieces 40 of smaller size) that the tempered glass substrate 10 experiences upon fracture 42 by increasing the degree of fragmentation to cause more pieces 40 having a smaller size.

Figure 6:
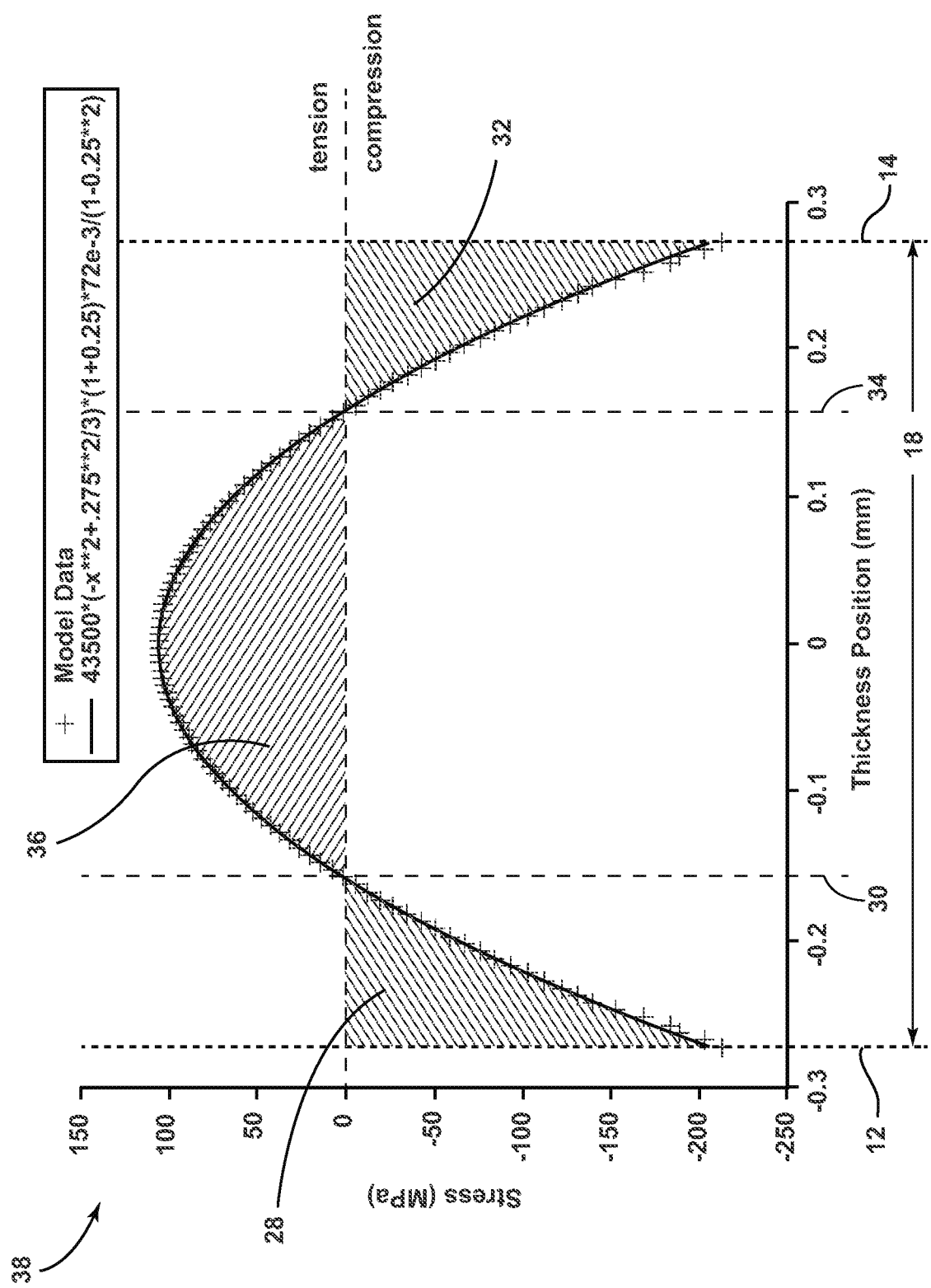
FIG. 6 is a graph illustrating a stress profile of the glass substrate of FIG. 1, imparted via tempering, while in the first, unbent position.

An analytical model illustrates these points. For the analytic model, it can be assumed that the glass substrate 10, after tempering, has a stress profile as illustrated in FIG. 6, based on an underlying assumption of a thickness 18 of 0.55 mm. The stress profile profiles the stress of the glass substrate 10 as a function of position through the thickness 18 of the glass substrate 10 after tempering. A negative stress value is compressive stress, while a positive stress value is tensile stress. The compressive stress, as mentioned, extends from the first surface 12 through the DOC 30 of the first layer 28, and extends from the second surface 14 through the DOC 34 of the second layer 32. The tensile stress, as mentioned, extends within the central region 36 between the first layer 28 and the second layer 32 of compressive stress.

Next, the analytical model can account for the stress that uniaxial bending of the glass substrate 10 induces along the bend axis 46 of the bend as a function of a z-axis position through the thickness 18 of the glass substrate 10 via a linear equation. The linear equation is:

$$\sigma_{bending}(z) = -\frac{2(\sigma_{bendingmax})(z)}{t}$$

Figure 7:
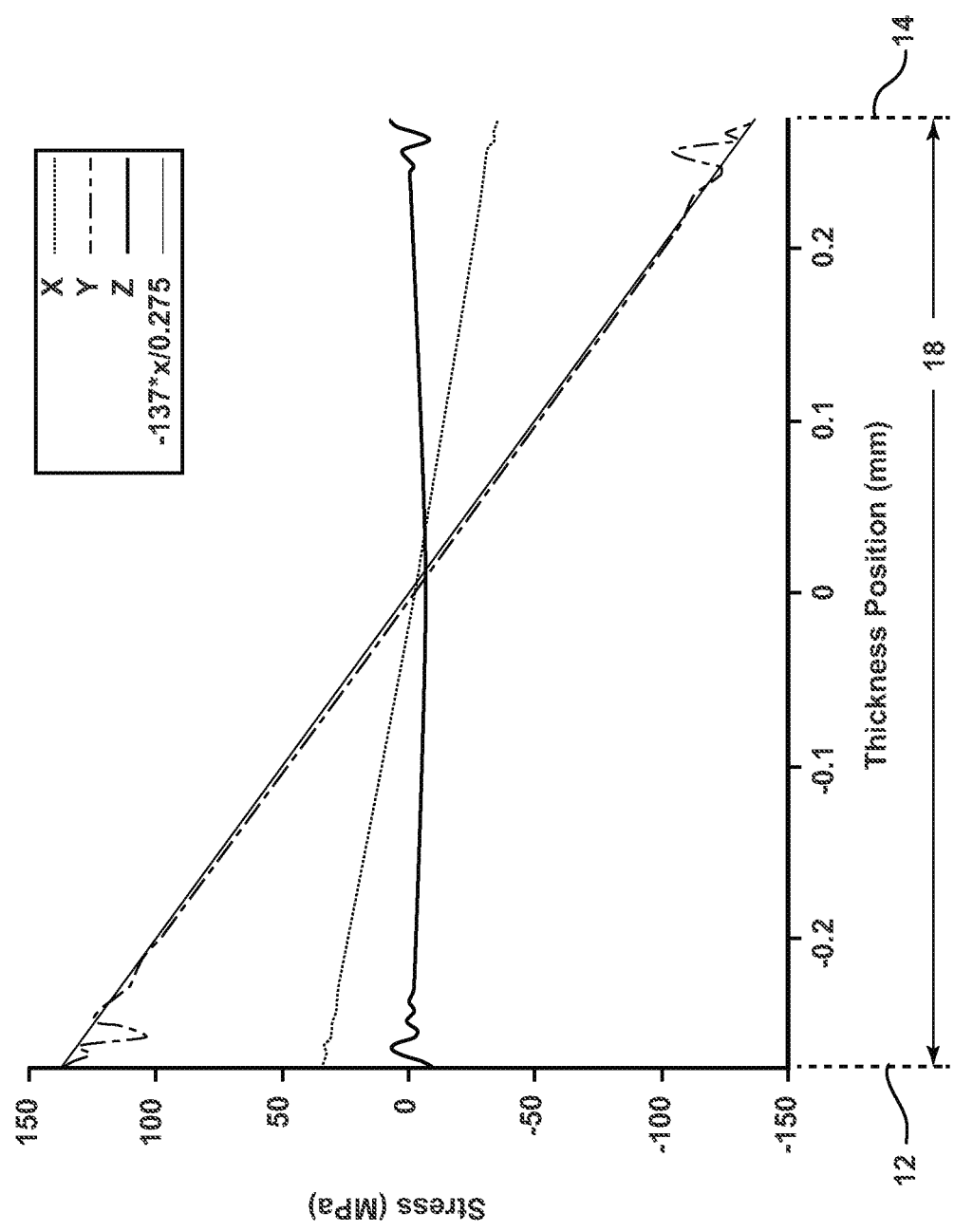
FIG. 7 is a graph illustrating a profile of the stress imparted via bending upon the glass substrate of FIG. 1 after bending the glass substrate to and maintaining the glass substrate in the second position illustrated in FIG. 5.

The variable z is the value of the z-axis position through the thickness t 18 of the glass substrate 10. The variable $\sigma_{bendmax}$ is an assigned value and is the maximum bending stress at the first surface 12. If we assume again that the thickness t 18 of the glass substrate 10 is 0.55 mm and the maximum bending stress $\sigma_{bendmax}$ applied to the glass substrate 10 is 137 MPa, then the results of the linear equation above can be plotted. Such plotting is illustrated in FIG. 7. In this analytical model, the bending of the glass substrate 10 occurs along the bend axis 46, which is the y-axis in this model. Therefore, the largest bending stresses are experienced along the y-axis. However, bending the glass substrate 10 along the y-axis will also induce stress along the x-axis, albeit a lesser stress than along the y-axis, because of the Poisson ratio effect. Note that the bending stress from the first surface 12 to the middle of the thickness 18 of the glass substrate 10 is a tensile stress, which counters the compressive stress generated via tempering within the first layer 28 and adds to the tensile stress generated via tempering in the central region 36 from the middle of the thickness 18 toward the first layer 28. In addition, note that the bending stress from the middle of the thickness 18 to the second surface 14 is a compressive stress, which counters the tensile stress generated via tempering from the middle of the thickness 18 toward the second layer 32 and adds to the compressive stress generated via tempering within the second layer 32.

Therefore, the analytical model proves a novel method of increasing compressive stress within a layer of the glass substrate 10 (either the first layer 28 or the second layer 32, depending on the direction of the bend). That method includes forming the glass substrate 10, as described above. The method further includes imparting, via tempering the glass substrate 10, the first compressive stress within the first layer 28 from the first surface 12, and within the second layer 32 from the second surface 14. The method then includes bending the tempered glass substrate 10 along the bend axis 46 of the glass substrate 10 in the direction of the second surface 14 to add compressive stress to the first compressive stress within the second layer 32. Contrarily, if the desire were to add compressive stress to the first compressive stress within the first layer 28, then the method would include bending the tempered glass substrate 10 along the bend axis 46 in the direction of the first surface 12. Imparting the first compressive stress within the first layer 28 and the second layer 32 of the glass substrate 10, in an embodiment of the method, includes thermal tempering of the glass substrate 10. Imparting the first compressive stress within the first layer 28 and the second layer 32 of the glass substrate 10, in an embodiment of the method, includes chemical tempering of the glass substrate 10. In an embodiment of the method, the second surface 14 of the glass substrate 10 is a top surface of the glass substrate 10. This method of increasing the compressive stress at either the first layer 28 or the second layer 32 of the glass substrate 10, is especially beneficial when the glass substrate 10 has a relatively thin thickness 18 (2 mm or less, 1.8 mm or less, 1.6 mm or less, 1.5 mm or less, 1.4 mm or less, 1.2 mm or less, 1 mm or less, or 0.75 mm or less, or 0.55 mm or less, for examples), because chemical tempering such a thin glass substrate 10 might not be able to impart a requisite compressive stress at the second layer 32.

Continuing the analytical model, a one-dimensional stress profile of the glass substrate 10 after tempering and after bending can be calculated as a function of the z-axis position along the thickness t 18 of the glass substrate 10, according to the following equation:

$$\sigma(z) = -\frac{12\sigma_{CT}z^2}{t^2} + \sigma_{CT} + \frac{2\sigma_{bendmax}z}{t}$$

The variable $\sigma(z)$ is the total stress as a function of the position z along the z-axis thickness t 18 of the glass substrate 10. The variable $\sigma_{CT}$ is the maximum tensile stress within the central region 36 of the glass substrate 10 as a result of tempering alone. As explained above, the variable $\sigma_{bendmax}$ is the maximum bending stress at the first surface 12.

Squaring and integrating the above equation provides a squared stress integral, which provides a relative degree of fragmentation of the glass substrate 10 upon fracture 42. This equation is as follows:

$$K_f^2 = \int_{z1}^{z2} \sigma^2(z)dz = \frac{\sqrt{12\sigma_{dt}^2 + \sigma_{bendmax}^2}\,(144\sigma_{CT}^4 + 24\sigma_{bendmax}^2\sigma_{CT}^2 + \sigma_{bendmax}^4)t}{1620\sigma_{CT}^3}$$

Figure 8:
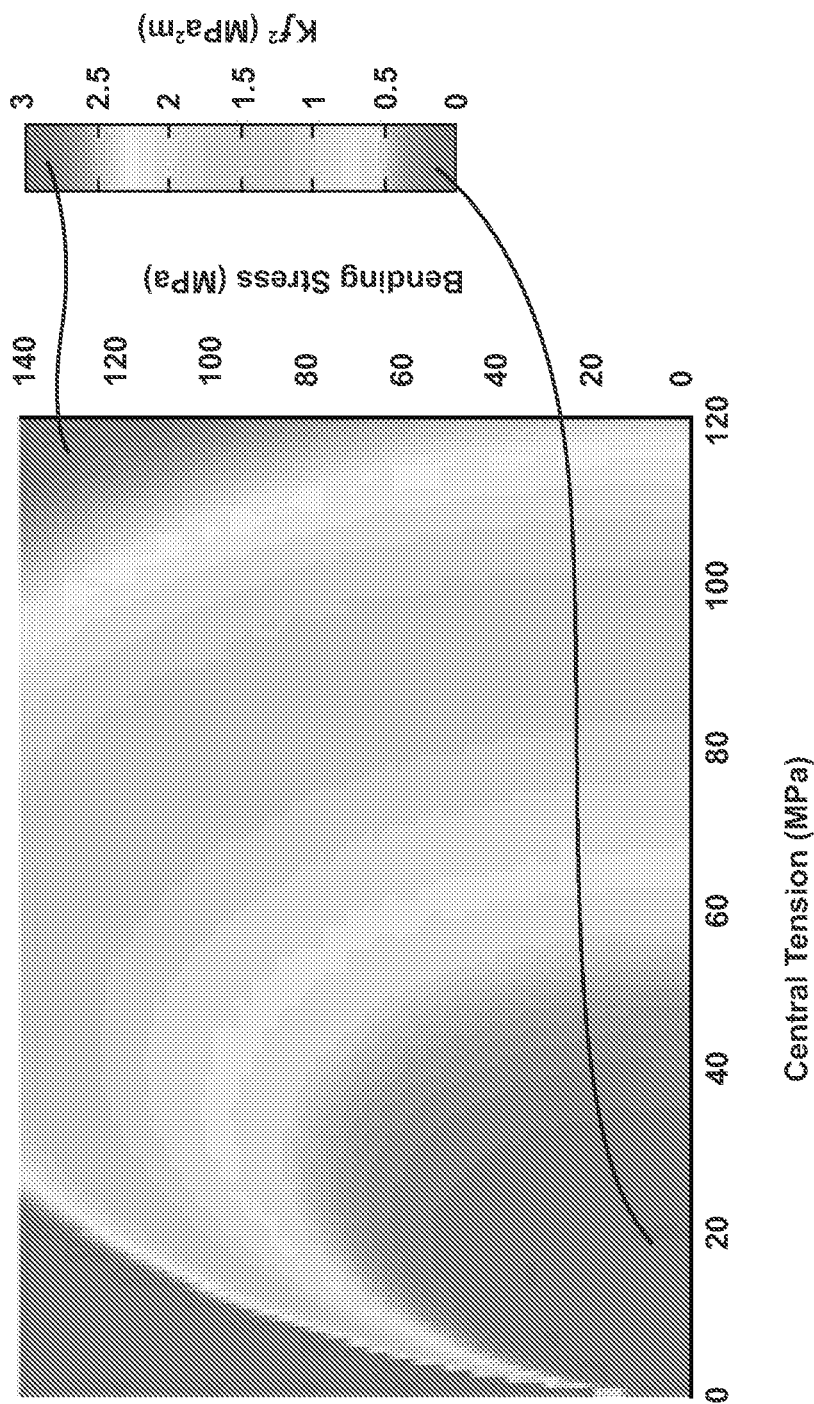
FIG. 8 is a graph illustrating that the degree of fragmentation of the glass substrate of FIG. 1 upon fracture while in the second (bent) position (represented by the squared stress integral $K_f^2$) is dependent upon both the tensile stress (central tension) imparted via tempering and the tensile stress imparted via bending (bending stress)

The symbol $K_f^2$ denotes the squared stress integral. The variables $z^1$ and $z^2$ are the roots of the squared stress integral function corresponding to the z-axis positions through the central region 36 of thickness t 18 from one depth of layer DOC ($z^1$) to the other depth of layer DOC ($z^2$). As FIG. 8 illustrates, the squared stress integral $K_f^2$ increases as the maximum bending stress increases $\sigma_{bendmax}$, which corresponds to a high degree of fragmentation (i.e., more pieces 40 and smaller size of pieces 40) upon fracture 42. In other words, even if tempering imparts a relatively low amount of tensile stress (central tension) into the central region 36 (i.e., too low to cause fragmentation into pieces 40 having a small size upon fracture 42), bending adds tensile stress to the tensile stress already imparted via tempering at a portion of the central region 36 away from the direction of the bend. The increased tensile stress increases the squared stress integral $K_f^2$ and, thus, the degree of fragmentation upon fracture. Accordingly, even if the tensile stress imparted to the central region 36 of the glass substrate 10 via tempering was insufficient to cause fragmentation of the glass substrate 10 into pieces 40 having a small size upon fracture 42, the added tensile stress imparted via bending the glass substrate 10 may be sufficient to cause such a high degree of fragmentation.

Applicant has confirmed the analytical model through physical experimentation. Applicant formed a glass substrate 10 having a thickness t 18 of 0.7 mm. Applicant imparted the glass substrate 10 with tensile stress via chemical tempering. Specifically, Applicant submitted the glass substrate 10 to ion exchange at 420° C. for 5.5 hours. As a result, the glass substrate 10 had a maximum tensile stress (central tension) $\sigma_{CT}$ at the central region 36 of 70 MPa.

Figure 9:
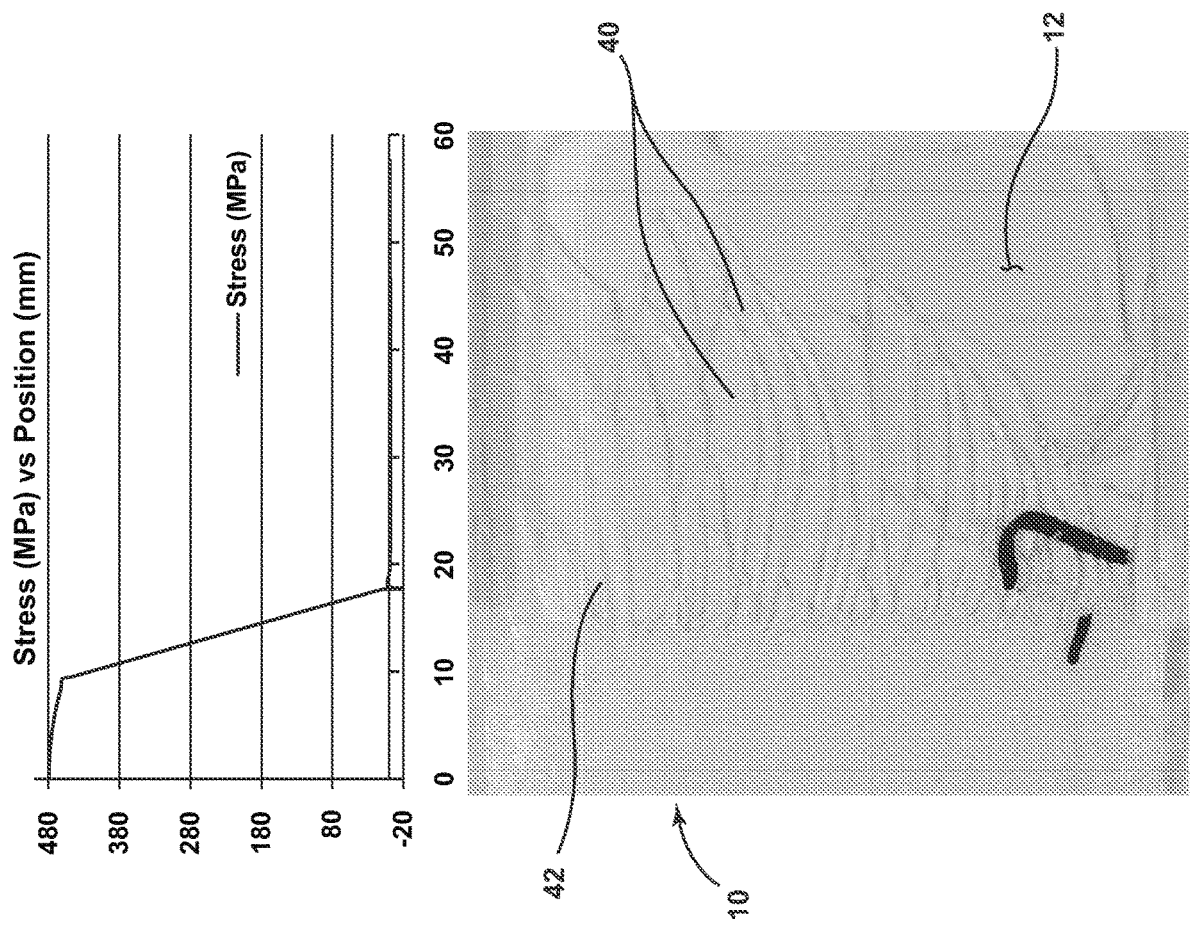
FIG. 9 is a picture of a tempered glass substrate after fracture while in the second position (bent) illustrating that the tensile stress added via bending to the tensile stress imparted via tempering (left part of picture) results in a higher degree of fragmentation upon fracture (smaller pieces, more pieces) than the tensile stress imparted via tempering alone (right part of picture—larger pieces, less pieces)
Figure 10:
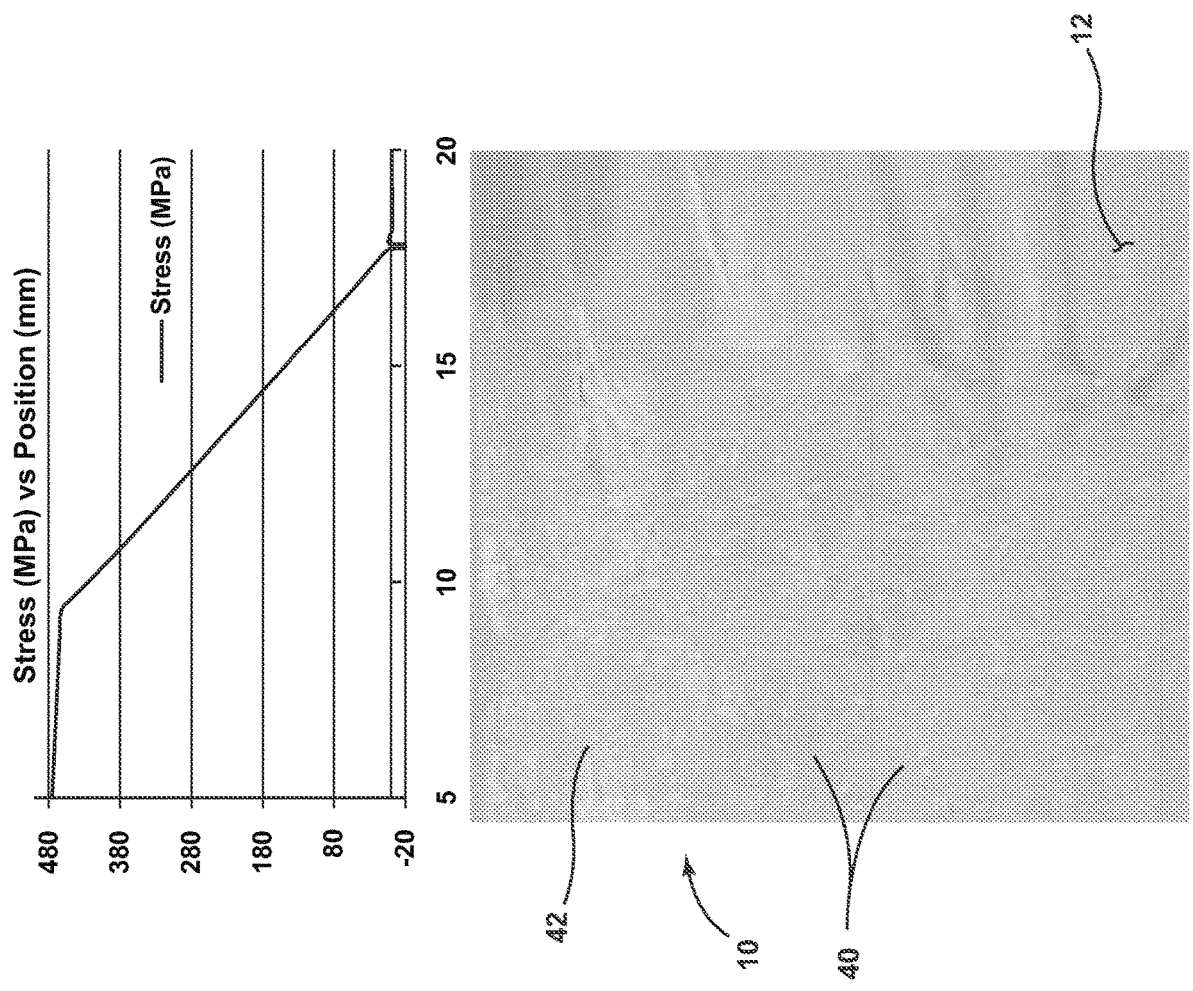
FIG. 10 is a magnified view of an area of the picture of FIG. 9.

Applicant then applied a bending stress to the glass substrate 10 using a 4-point bend apparatus. The middle two points of the bending apparatus were placed 9 mm from center of the glass substrate 10. The outer two points of the bending apparatus were placed 18 mm from center of the glass substrate 10. The apparatus applied bending stress until the glass substrate 10 fractured 42. The bending stress that caused the glass substrate 10 to fracture 42 was approximately 480 MPa. At FIG. 9, a picture of the glass substrate 10 after fracture 42 is depicted below a graph illustrating the bending stress applied to the glass substrate 10 as a function of position along the width 20 of the glass substrate 10. FIG. 10 shows the same thing but magnified to show a region where bending stress was applied and a region where bending stress was not applied. The drop in bending stress from approximately 480 MPa to zero coincides with the picture of FIG. 10 and represents where one of the middle 2 points of the 4-point bend apparatus was applied to the glass substrate 10. The glass substrate 10 experienced the bending stress of approximately 480 MPa between the two middle points of the bending apparatus. The glass substrate 10 exhibits a high degree of fragmentation (small pieces 40) where the bending stress of approximately 480 MPa was applied to the glass substrate 10. In contrast, the glass substrate 10 exhibits a low degree of fragmentation (large pieces 40) where no bending stress was applied (approximately between the inner point and the outer point on each side of the apparatus), which demonstrates that the tensile stress in the central region 36 from tempering alone was insufficient to cause a high degree of fragmentation (small pieces 40) upon fracture 42. The contrast demonstrates that bending stress can add the tensile stress required for the glass substrate 10 to exhibit a high degree of fragmentation upon fracture 42, when tempering the glass substrate 10 did not add sufficient tensile stress to achieve a high degree of fragmentation.

Figure 11:
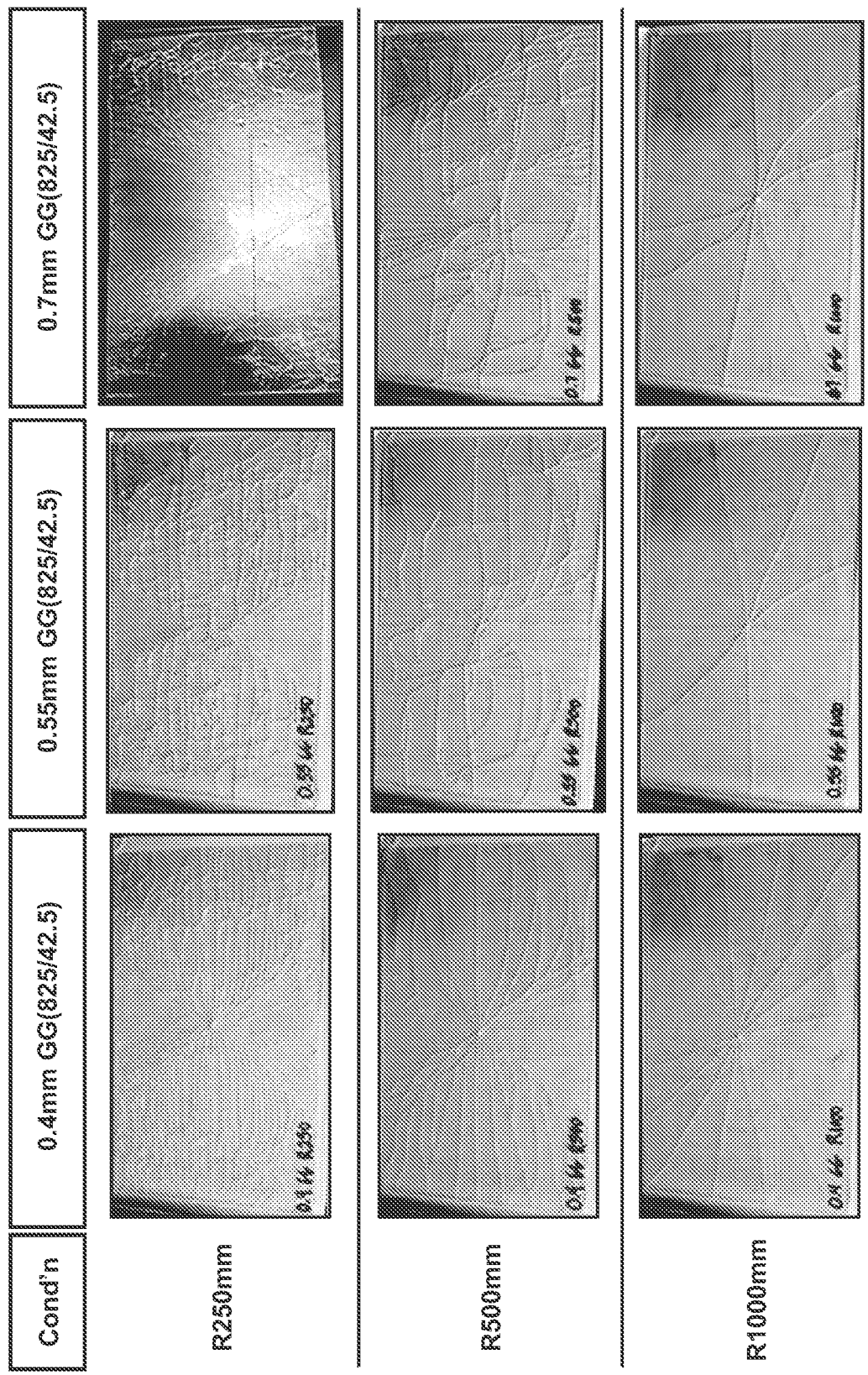
FIG. 11 is a series of pictures of tempered glass substrates after fracture while in the second position (bent) illustrating that the degree of fragmentation is a function of the radius of the bend (smaller bend radius imparts more tensile stress resulting in higher degree of fragmentation) and a function of the thickness of the glass substrate (larger thickness results in a higher degree of fragmentation)
Figure 12B:
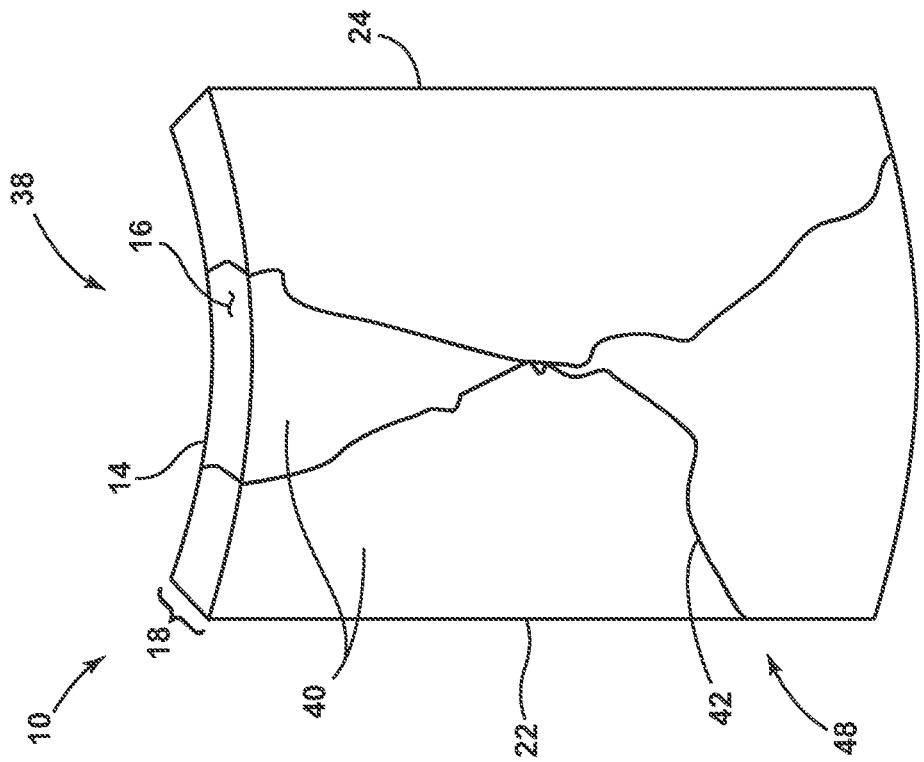
FIG. 12B is a perspective view of the glass substrate of FIG. 12A, illustrating fragmentation of the glass substrate into pieces of a first size (large) upon fracture.
Figure 12A:
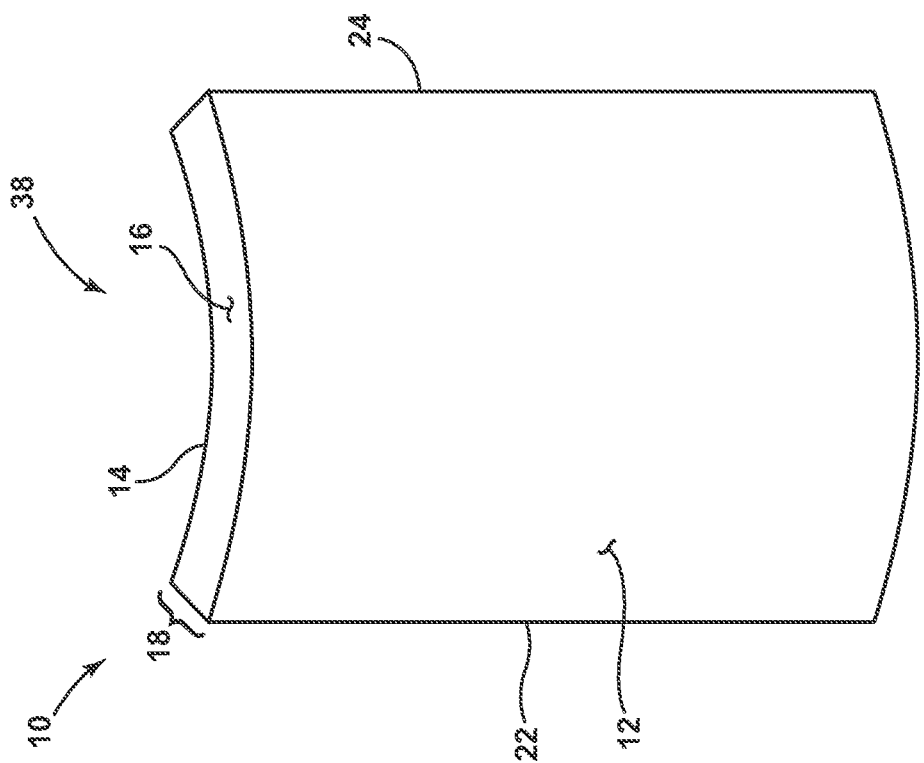
FIG. 12A is a perspective view of a glass substrate (tempered) like the glass substrate of FIG. 1 but having a first surface and a second surface that is curved in a first position (no applied bending)
Figure 13B:
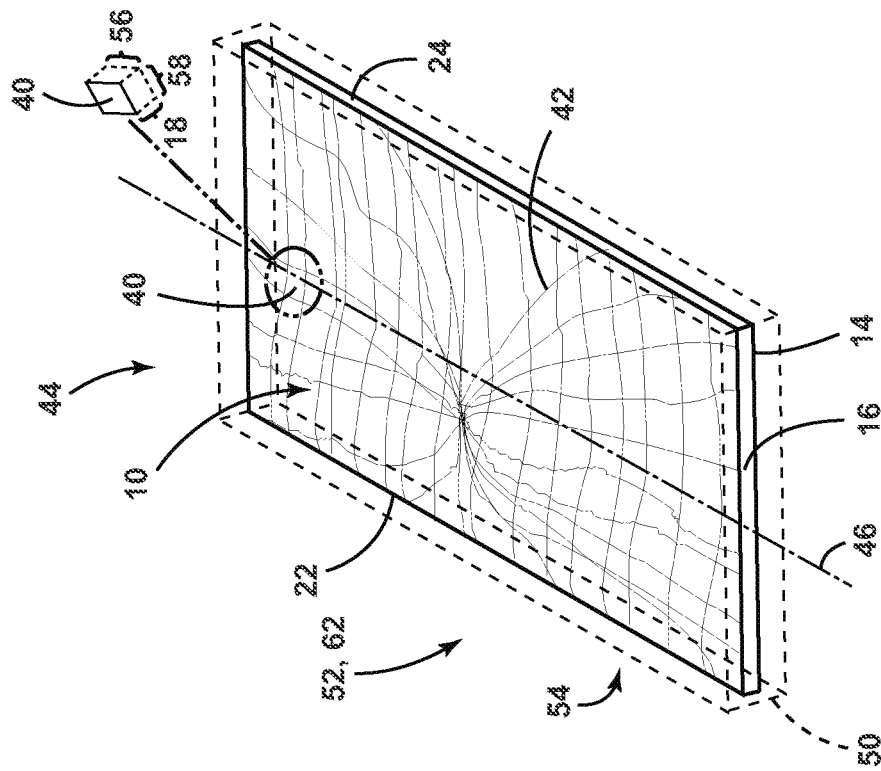
FIG. 13B is a perspective view of the product of FIG. 13A incorporating the glass substrate of FIG. 12A, illustrating the glass substrate fragmenting into pieces of a second size (small pieces) due to the additional tensile stress imparted to regions of the glass substrate via bending the glass substrate to the second position.
Figure 13A:
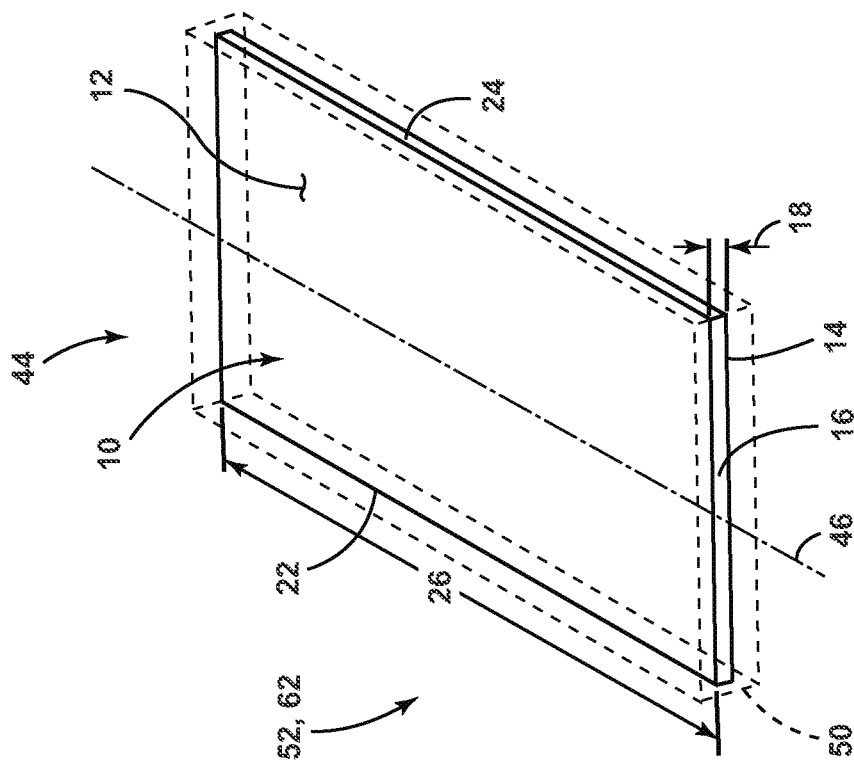
FIG. 13A is a perspective view of a product (safety glass) incorporating the glass substrate of FIG. 12A, illustrating the glass substrate having been bent to a second position along a bend axis such that the first surface and the second surface are flat, and a component of the product maintaining the glass substrate in the second position.
Figure 14B:
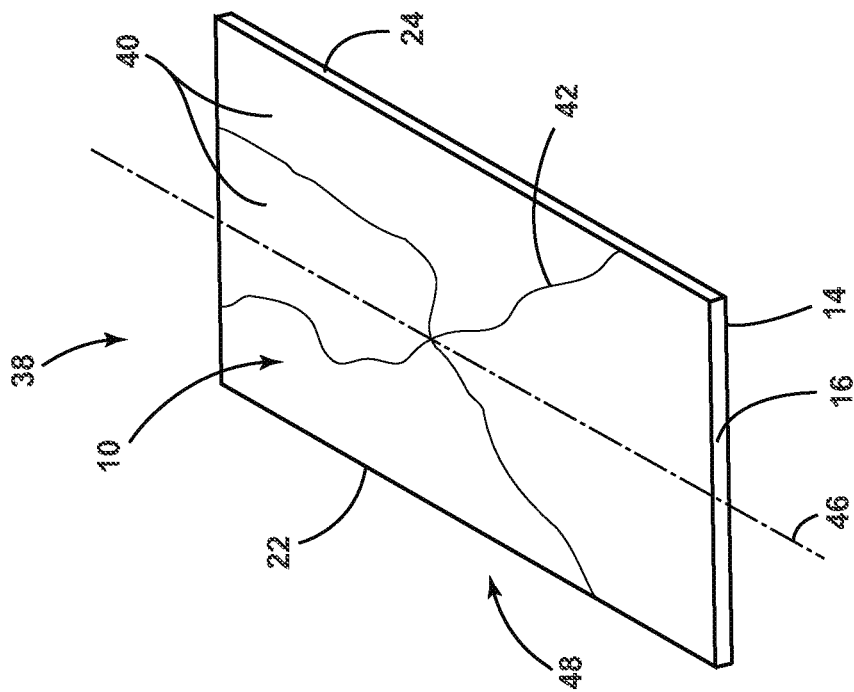
FIG. 14B is a perspective view of the glass substrate of FIG. 14A, illustrating fragmentation of the glass substrate into pieces of a first size (large) upon fracture.
Figure 14A:
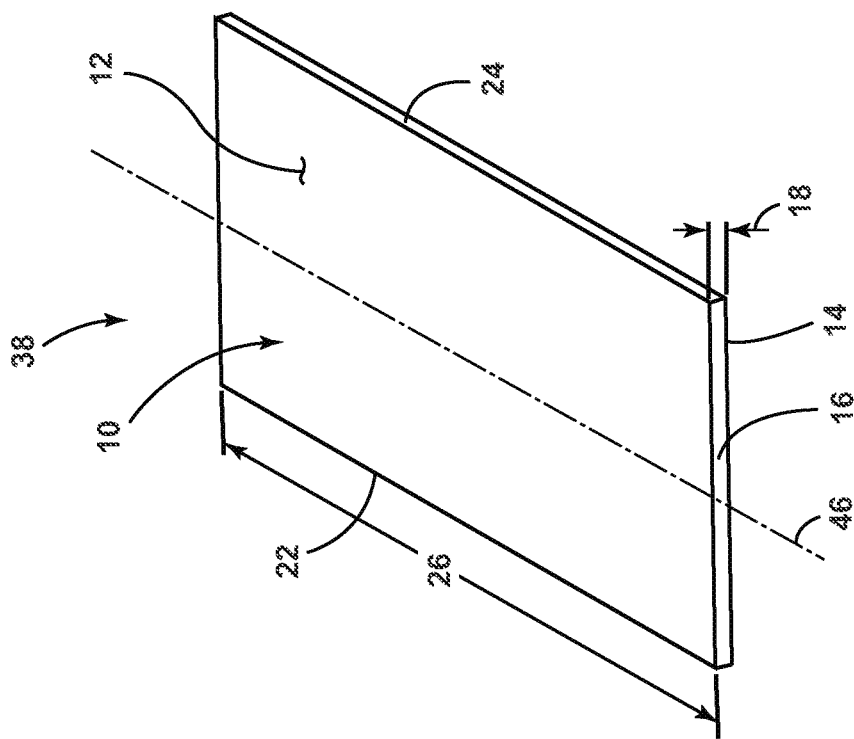
FIG. 14A is a perspective view of a glass substrate (tempered) like the glass substrate of FIG. 1, having a first surface and a second surface that is flat in a first position (no applied bending)

Referring now to FIG. 11, in another physical experiment, Applicant chemically tempered nine samples of the glass substrate 10. The nine samples were grouped into three thicknesses 18, three samples each of 0.4 mm, 0.55 mm, and 0.7 mm thickness. The chemical tempering via ion-exchange imparted compressive stress of 825 MPa at the first layer 28 and the second layer 32 of each sample glass substrate 10. The compressive stress depth of layer (DOC) was 42.5 μm. The resulting tensile stress was insufficient to cause fragmentation of the glass substrate 10 into small pieces 40 upon fracture 42. One glass substrate 10 of each thickness 18 was cylindrically (uniaxially) bent at constant radii of 250 mm, 500 mm, and 1000 mm from the first position 38 to the second position 44, maintained in the second position 44 (bent), and then indented in the center until the glass substrate 10 fractured 42.

As the pictures reproduced at FIG. 11 demonstrate, the more aggressive the bend (that is, the smaller the bend radius), the smaller the pieces 40 of fragmentation upon fracture 42 of the glass substrate 10. For example, for the three samples having the thickness 18 of 0.4 mm, the glass substrate 10 subjected to the bending radius of 500 mm produced smaller pieces 40 of fragmentation upon fracture 42 than the glass substrate 10 subjected to the bending radius of 1000 mm. The glass substrate 10 subjected to the bending radius of 250 mm produced still smaller pieces 40 of fragmentation upon fracture 42 than the glass substrate 10 subjected to the bending radius of 500 mm. Therefore, the more aggressive the bend imposed on the glass substrate 10 to change the glass substrate 10 from the first position 38 to the second position 44, the more likely the glass substrate 10 fragments into small pieces 40 upon fracture 42.

In addition, the pictures reproduced at FIG. 11 demonstrate the thicker the thickness 18 of the glass substrate 10, the smaller the pieces 40 of fragmentation upon fracture 42 of the glass substrate 10. For example, for the three samples bent at a constant radius of 500 mm, the glass substrate 10 having a thickness 18 of 0.55 mm produced smaller pieces 40 of fragmentation upon fracture 42 than the glass substrate 10 having a thickness 18 of 0.4 mm. The glass substrate 10 having a thickness 18 of 0.7 mm produced still smaller pieces 40 of fragmentation upon fracture 42 than the glass substrate 10 having the thickness 18 of 0.55 mm. Therefore, the thicker the thickness 18 of the glass substrate 10, the more likely the glass substrate 10 fragments into small pieces 40 upon fracture 42 for any given bend radius imposed on the glass substrate 10.

Referring now to FIGS. 12A-15B, Applicant has, therefore, discovered a novel method of reducing the size of the pieces 40 that the glass substrate 10 fragments into upon fracture 42 of the glass substrate 10. The method includes forming the glass substrate 10 that fragments into pieces 40 having a first size 48 upon fracture 42 of the glass substrate 10 (see FIGS. 12A and 12B). As discussed, the glass substrate 10 as formed is in the first position 38 and is tempered. However, the resulting tensile stress of the glass substrate 10 is insufficient to cause the glass substrate 10 to fragment into small pieces 40 upon fracture 42. The method further includes bending the glass substrate 10 to the second position 44 and maintaining the glass substrate 10 in the second position 44. A component 50, such as a structural component like a windowpane frame or a material such as an adhesive, can maintain the glass substrate 10 in the second position 44. In other words, in an embodiment, bending and maintaining the glass substrate 10 in the second position 44 is achieved at an ambient temperature by a structural component of a product 52 that utilizes the glass substrate 10. In one or more embodiment, an adhesive may be used to permanently hold the glass substrate 10 in the second position 44 by bonding the glass substrate to a curved underlying surface (not shown).

Maintained in the second position 44, the glass substrate 10 fragments into pieces 40 having a second size 54 upon fracture 42 of the glass substrate 10. The pieces 40 having the second size 54 are smaller than the pieces 40 having the first size 48. In some embodiments, the pieces 40 having the second size 54 have a length 56 and a width 58 that are approximately equal to each other, and, in some embodiments, approximately equal to the thickness 18 (i.e., dicing fragmentation behavior). In an embodiment, forming the glass substrate 10 includes forming the glass substrate 10 with the thickness 18 of 2 mm or less. In an embodiment, bending the glass substrate 10 includes uniaxial bending of the glass substrate 10 along the bend axis 46 of the glass substrate 10, as in the embodiment illustrated in FIGS. 12A-13B. In an embodiment, forming the glass substrate 10 includes forming the glass substrate 10 with a first surface 12 that is curved, as in the embodiment illustrated in FIGS. 12A and 12B. Annealing the glass substrate 10 can form the glass substrate 10 with the first surface 12 that is curved while in the first position 38. In an embodiment, bending the glass substrate 10 to the second position 44 includes bending the glass substrate 10 so that the first surface 12 is less curved in the second position 44 than in the first position 38, or not curved, as is in the embodiment illustrated in FIG. 13A.

In an embodiment, as in the embodiment illustrated in FIGS. 14A-15B, bending the glass substrate 10 includes biaxial bending. Biaxial bending of the glass substrate 10 is bending of the glass substrate 10 at a first bend axis 46a and a second bend axis 46b. Note that in the embodiment illustrated at FIGS. 14A-B, forming the glass substrate 10 includes forming the glass substrate 10 with the first surface 12 that is flat (that is, not curved). The component 50 of the product 52 bends the glass substrate 10 to the second position 44 or hold the glass substrate 10 in the second position 44. Fragmentation of the glass substrate 10 upon fracture 42 in the second position 44 generates pieces 40 of the second size 54 that are smaller than the pieces 40 of the first size 48 generated when the glass substrate 10 fractures 42 in the first position 38. Because the glass substrate 10 is biaxially bent in the second position 44, when the glass substrate 10 fragments upon fracture 42 of the glass substrate 10, the pieces 40 form an in-plane isotropic fracture pattern 60.

In any event, the glass substrate 10 is formed and tempered in the first position 38 but can be forced into the second position 44. In the first position 38, the tensile energy of the glass substrate 10 (imparted via tempering) is insufficient to cause fragmentation of the glass substrate 10 into pieces 40 having the small second size 54 upon fracture 42. Instead, the tensile energy causes fragmentation of the glass substrate 10 into the pieces 40 having the first size 48 (the larger size). However, upon bending the glass substrate 10 to the second position 44, the stress profile of the glass substrate 10 is altered relative to the first position 38, increasing the tensile stress at a certain portion of the central region 36. Thus, in the second position 44, the tensile energy of the glass substrate 10 is sufficient to cause fragmentation of the glass substrate 10 into pieces 40 having the second size 54 (i.e., small pieces 40) upon fracture 42 of the glass substrate 10. In some embodiments, such as that illustrated in FIG. 14A, the glass substrate 10 is formed and tempered flat. In other words, in the first position 38, the first surface 12 and the second surface 14 of the glass substrate 10 are planar. Therefore, in the first position 38, the glass substrate 10 is flatter than the glass substrate 10 is in the second position 44. In some embodiments, such as that illustrated at FIG. 13B, the pieces 40 of the second size 54 (the small pieces) are generally cubic, having the length 56, the width 58, and the thickness 18 that are all generally of equal value. In some embodiments, such as that illustrated in FIGS. 13A and 13B, the glass substrate 10 is bent uniaxially along the bend axis 46 in the second position 44. In some embodiments, such as that illustrated in FIGS. 15A and 15B, the glass substrate 10 is bent biaxially along two bend axes 46a, 46b (the first bend axis 46a and the second bend axis 46b) in the second position 44. In some embodiments, the thickness 18 of the glass substrate 10 is 2 mm or less.

However, in other embodiments, such as that illustrated in FIGS. 12A-13B, the glass substrate 10 is formed and tempered curved. In other words, in the first position 38, the first surface 12 and the second surface 14 of the glass substrate 10 are curved (not flat). The glass substrate 10 is then bent to the second position 44. In the second position 44, the glass substrate 10 is flatter than the glass substrate 10 is in the first position 38. For example, in the second position 44, the first surface 12 and the second surface 14 can be planar (not curved).

In some embodiments, the glass substrate 10 is incorporated into the product 52. The product 52 comprises the glass substrate 10 and the component 50 that bends the glass substrate 10 away from the first position 38, in which the glass substrate 10 is formed and tempered, and to the second position 44. In one or more embodiments, product 52 comprises the glass substrate 10 and the component 50 that maintains or secures the glass substrate 10 in the second position 44. In the first position 38, the tensile energy of the glass substrate 10 is insufficient to cause fragmentation of the glass substrate 10 into pieces of the second size 54 (that is, small pieces) upon fracture 42 of the glass substrate 10. In the second position 44, which the component 50 forces the glass substrate 10 to take or in which the component 50 secures the glass substrate 10, the tensile energy of the glass substrate 10 is sufficient to cause fragmentation of the glass substrate 10 into pieces 40 of the second size 54 (that is, small pieces) upon fracture 42 of the glass substrate 10. In an embodiment, such as that illustrated at FIGS. 13A-13B, the product 52 is a safety glass 62, where the glass substrate 10 must fragment into small pieces 40 and eject outwards upon fracture 42. Note that in this embodiment, the glass substrate 10 has the first surface 12 and the second surface 14 facing in opposite directions. Because the component 50 is bending the glass substrate 10 along the bend axis 46 in a direction that compresses the first surface 12 (or the component 50 is securing the glass substrate in the second position along bend axis 46 in a direction that compresses the first surface 12), the first surface 12 has a higher compressive stress than the second surface 14. That may be especially beneficial for the safety glass 62. In the embodiment of FIGS. 15A and 15B, the product 52 is a consumer electronic device 64, such as a watch 66, that is configured to be worn on a wrist of a person 68 (see also FIG. 19). In one or embodiments, the product 52 is an automotive interior cover glass used in an automotive interior system.

To continue the analytical model, the squared stress integral $K_f^2$ can be determined for each stress component in the x-y plane ($\sigma_x$ and $\sigma_y$) and then compared to determine the orientation bias of the fragmentation (i.e., which direction over the x-y plane the fragmentation will generally be directed) upon uniaxial bending. If the glass substrate 10 is bent along the y-axis (the bend axis 46 in the running example), the bending stress is experienced along the x direction and the y direction experiences no bending stress. Therefore, the squared stress integral along the x direction, $K_{fx}^2$, will be different than the squared stress integral along the y direction, $K_{fy}^2$. The equations for $K_{fx}^2$ and $K_{fy}^2$ will be equal except for the bending stress $\sigma_{bendmax}$ experienced only along the x direction. Therefore, assuming $\sigma_y$ is along the bend axis 46 and therefore has a $\sigma_{bendmax}$ value of zero, and $\sigma_x$ has all the bending stress and therefore a value for $\sigma_{bendmax}$, the orientation bias OB of the fragmentation can be quantified as follows:

$$OB = \frac{K_{fx}^2}{K_{fy}^2} = \frac{\sqrt{12\sigma_{CT}^2 + \sigma_{bendmax}^2}\,(144\sigma_{CT}^4 + 24\sigma_{bendmax}^2\sigma_{CT}^2 + \sigma_{bendmax}^4)}{\sqrt{12\sigma_{CT}^2}\,(144\sigma_{CT}^4)}$$

Figure 16:
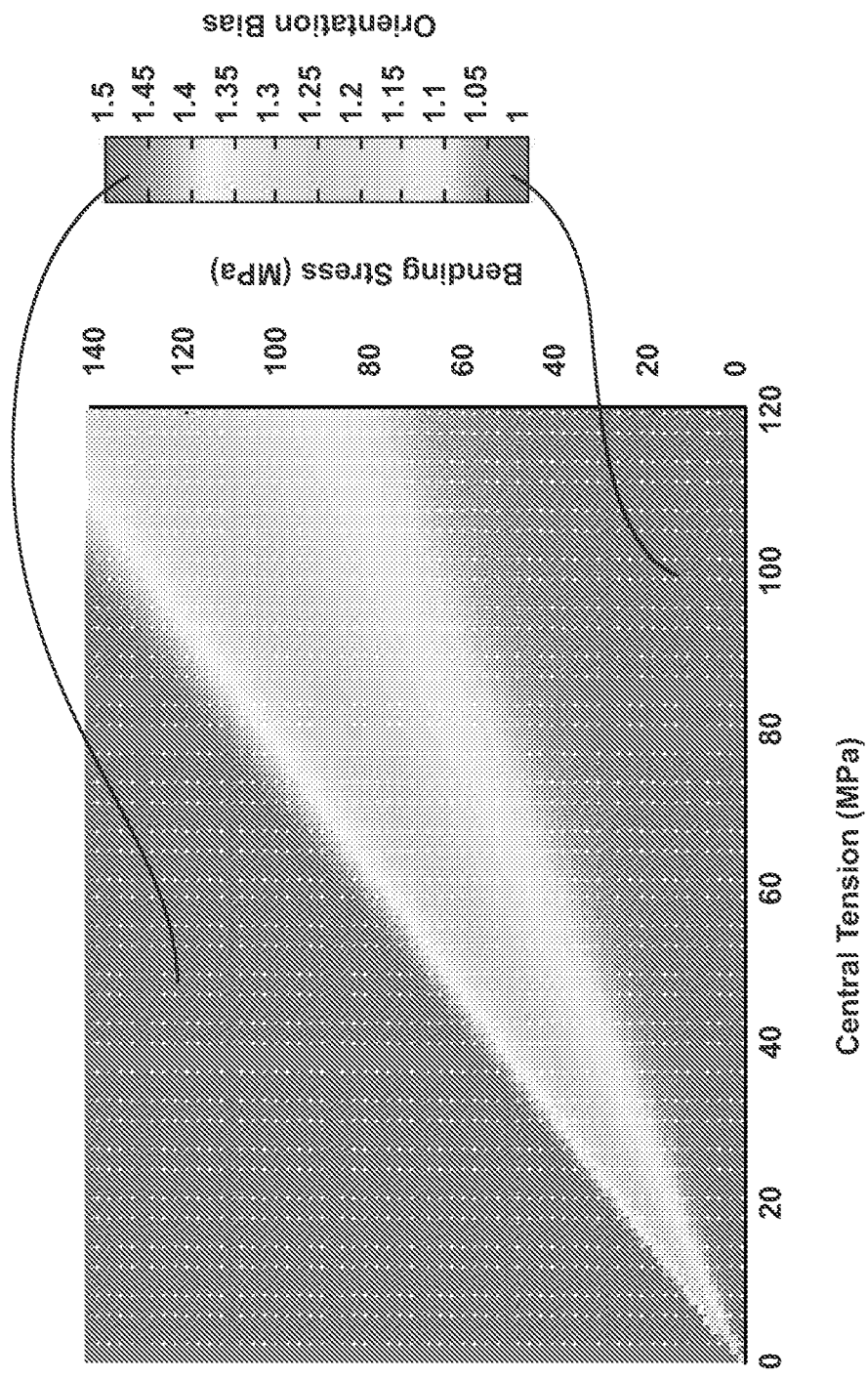
FIG. 16 is a graph illustrating that the orientation bias OB of fractures (i.e., which direction the fractures are biased to propagate) within the glass substrate of FIG. 1 while in the second (bent) position of FIG. 5 is dependent upon both the tensile stress (central tension) imparted via tempering and the tensile stress imparted via bending (bending stress)

Referring now to FIG. 16, the orientation bias OB of the fragmentation is graphed as a function of the tensile stress already existing from tempering (central tension, $\sigma_{CT}$) and the tensile stress added to the glass substrate 10 from bending (bending stress, $\sigma_{bendmax}$). The graph illustrates that the more bending stress that is added, the more the orientation bias of fragmentation. In this instance, because the bend is along the y-axis and therefore adds stress along the x direction, the orientation of the fragmentation is biased along the bend axis 46 (here, the y-axis). In other words, the fracture 42 between two pieces 40 is biased to be parallel the bend axis 46.

Figure 17:
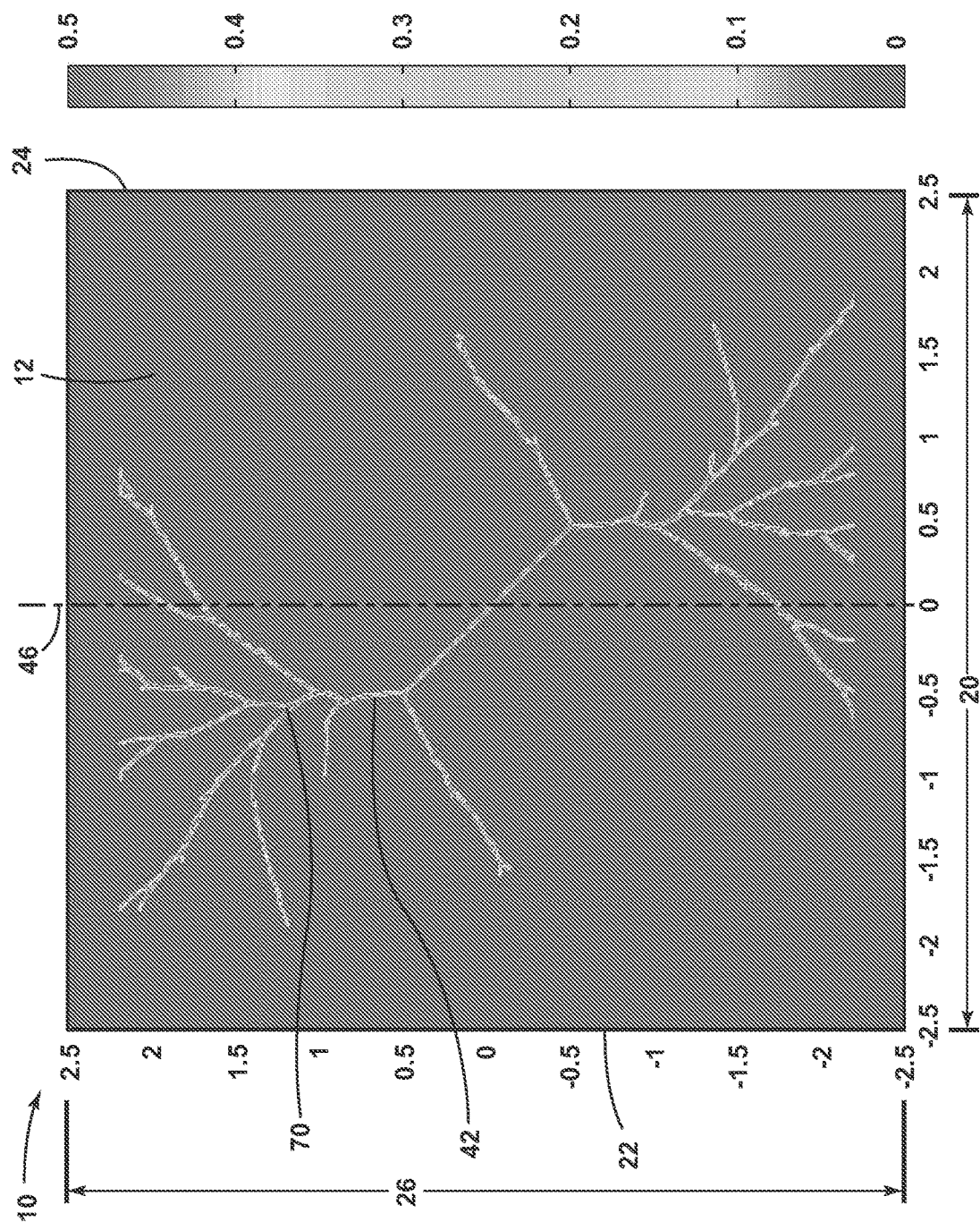
FIG. 17 is a graphical representation of a dynamic fracture simulation performed on a computer to produce a visualization of fragmentation of the glass substrate of FIG. 1 in the second position of FIG. 5 upon fracture, and the graphical representation illustrates propagation of the fracture generally parallel to the bend axis (the y-axis)

Referring now to FIG. 17, a dynamic fracture simulation, which utilized Peridynamic theory, was performed on a computer to produce a visualization of fragmentation of a glass substrate 10 upon fracture 42. The simulation assumed that the glass substrate 10 was tempered but not fragmenting into small pieces 40 upon fracture 42, with a central tension (tensile stress) of 105.27 MPa. The simulation assumed that the glass substrate 10 had dimensions of 5 mm of width 20, 5 mm of length 26, and 0.55 mm of thickness 18. The residual stress profile of the glass substrate 10 after tempering is that illustrated as FIG. 6. The simulation assumed that the bend axis 46 was vertical and an applied bending surface stress of 137 MPa. The bending stress profile applied to the glass substrate 10 is that illustrated as FIG. 7. The calculated orientation bias OB of the fragmentation was 1.39. The right positioned bar (0 to 0.5) represents material volume damage, where values greater than 0.34 represent the fracture 42 breaking through to the first surface 12. As the visualization of FIG. 17 illustrates, the fragmentation upon fracture 42 results in the fracture 42 extending generally parallel to the bend axis 46 (y-axis, up-down), with the fracture bifurcating 70 after a relatively short distance (relatively short vertical fracture 42 segments). The bending increases stress in the horizontal, x, direction and causes the relatively short vertical fracture 42 segments.

Figure 18:
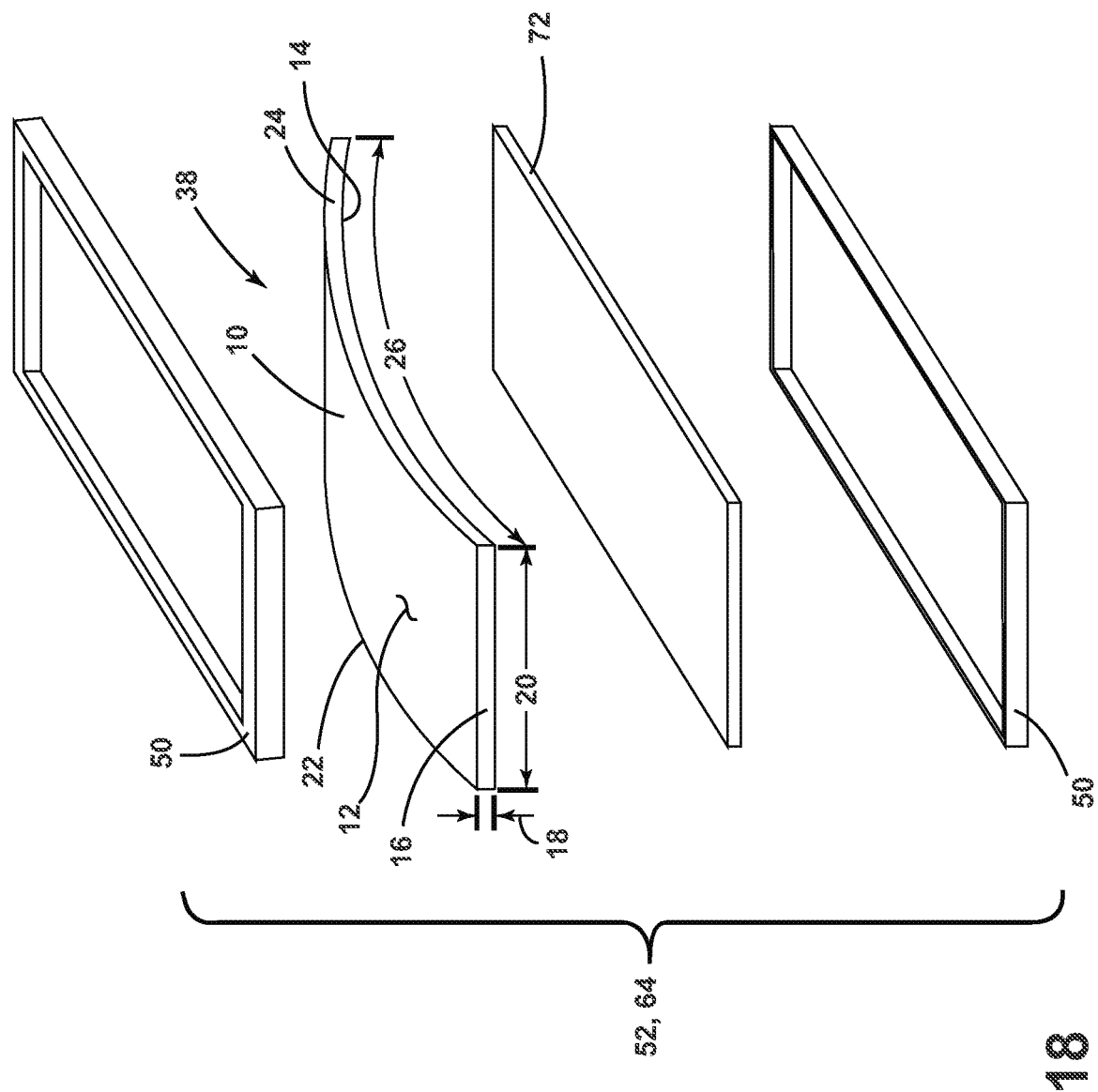
FIG. 18 is a blown-up perspective view of a consumer electronic device incorporating a glass substrate like the glass substrate of FIG. 1 but having a first surface and a second surface that are curved in a first position (not yet bent), and the glass substrate is disposed above a display screen.
Figure 19:
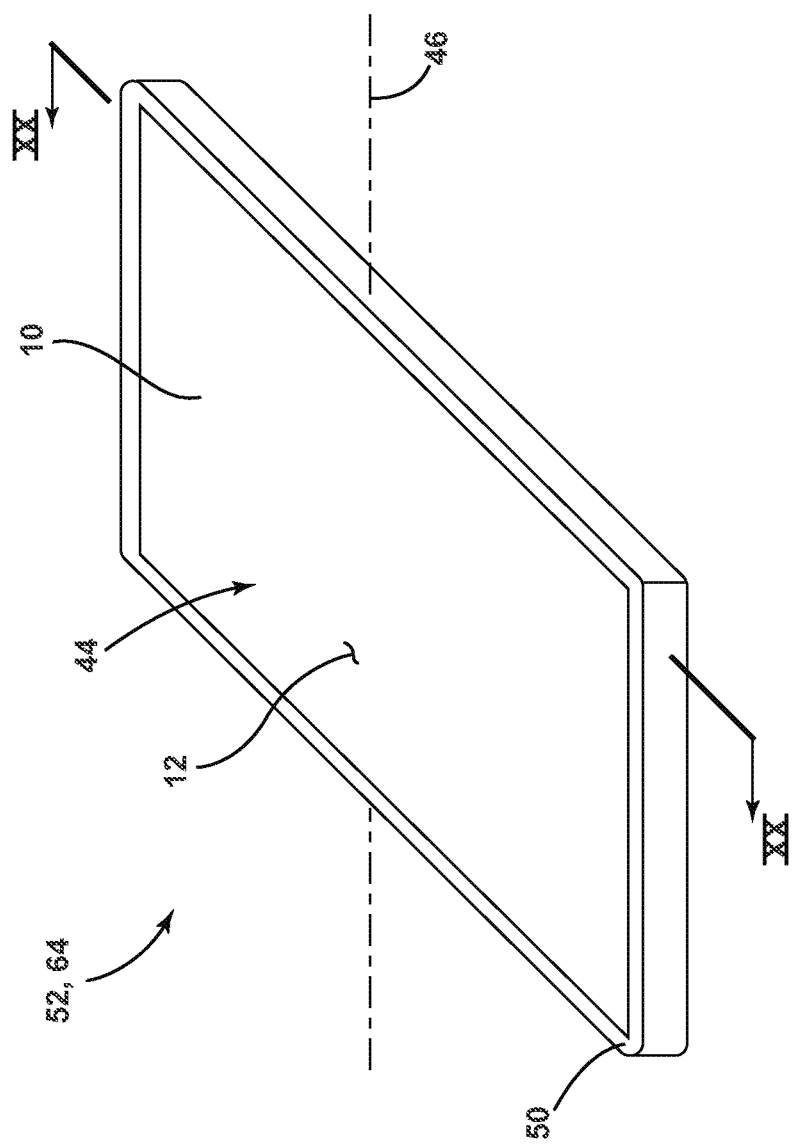
FIG. 19 is a perspective view of the consumer electronic device of FIG. 18, illustrating a component of the consumer electronic device bending the glass substrate along a bend axis into a second position and maintaining the glass substrate in the second position where the first surface and the second surface are flat.
Figure 20:
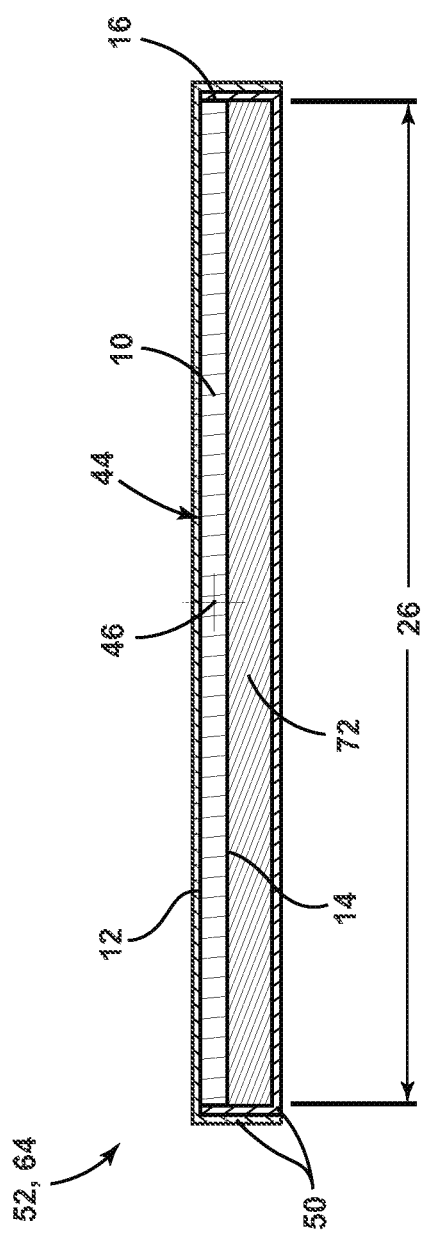
FIG. 20 is an elevational view of a cross section of the consumer electronic device of FIG. 18 while the glass substrate is in the second position (bent) in FIG. 19, taken along line XX-XX of FIG. 19.
Figure 21:
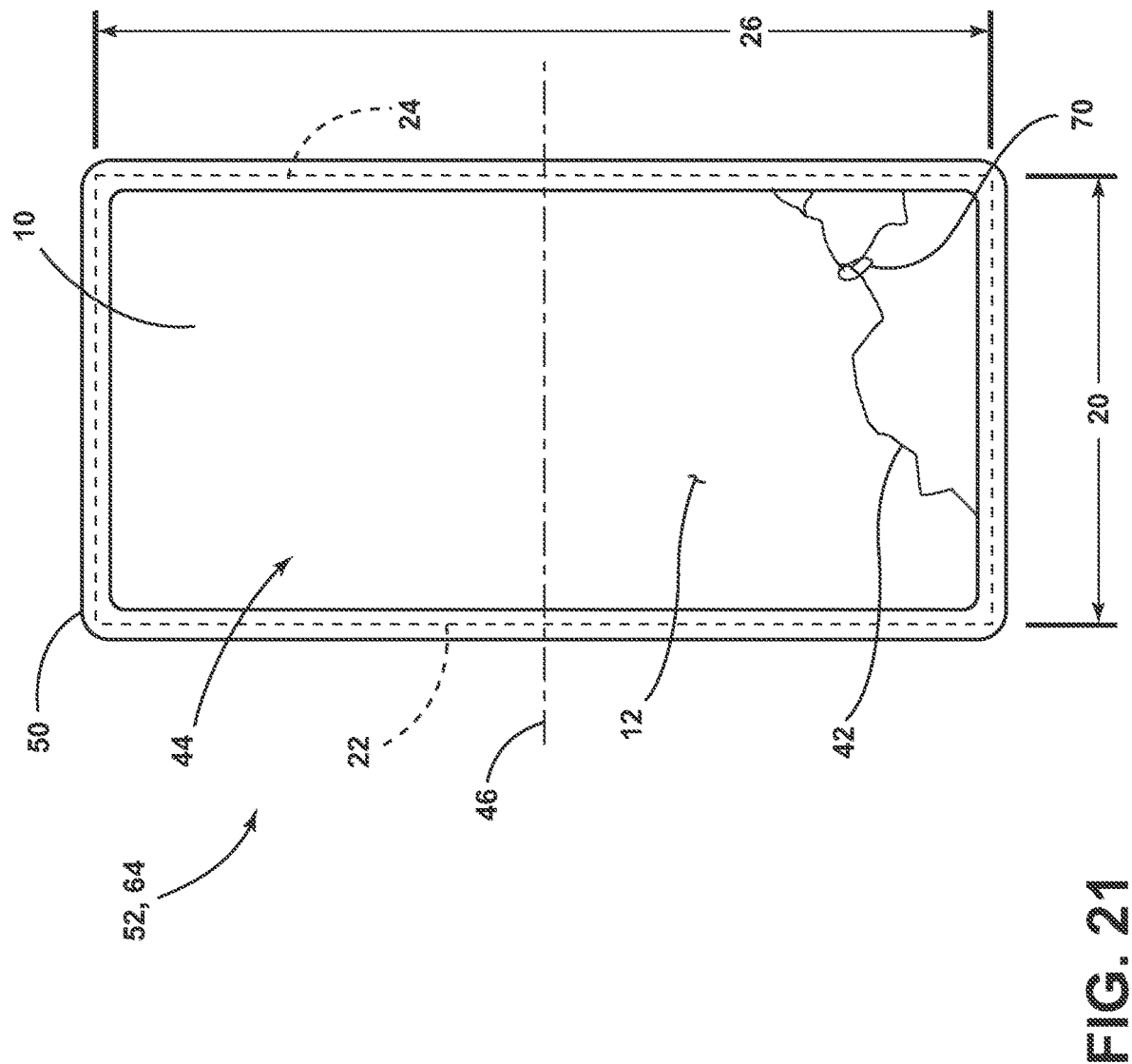
FIG. 21 is an overhead view of the consumer electronic device of FIG. 19 illustrating a fracture in the glass substrate propagating toward a second side of the glass substrate in a direction generally parallel to the bend axis.
Figure 22:
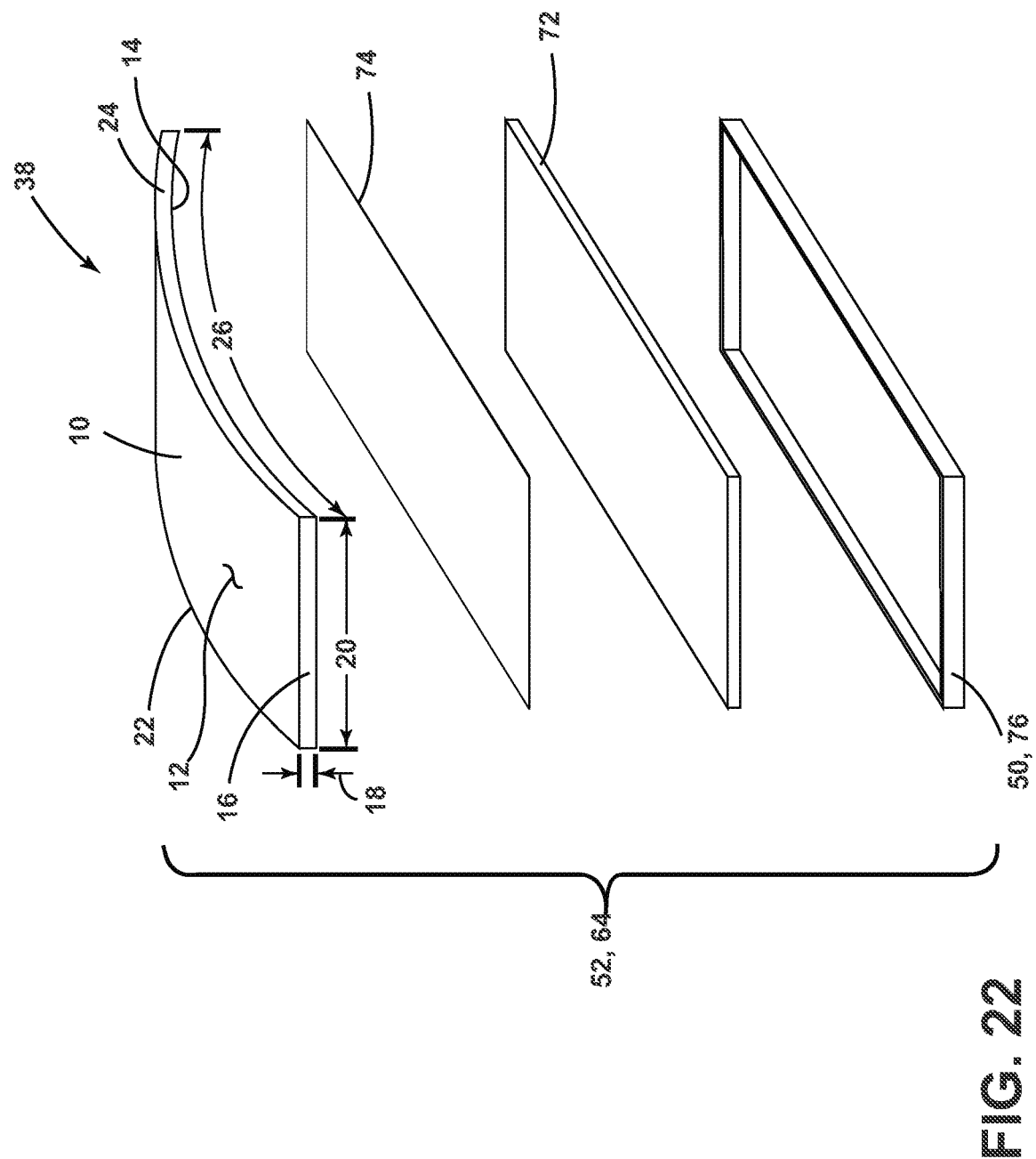
FIG. 22 is a blown-up perspective view of a consumer electronic device incorporating a glass substrate like the glass substrate of FIG. 1 but having a first surface and a second surface that are curved in a first position (not yet bent), and the glass substrate is disposed above a display screen with an adhesive layer between the glass substrate and the display screen.

The above analytical model demonstrates that applying a uniaxial bend to the glass substrate 10 can generally direct the fracture 42 of the glass substrate 10 in a particular direction. In this regard, referring now to FIGS. 18-23, the consumer electronic device 64 includes a glass substrate 10. The glass substrate 10 is disposed over a display screen 72. The glass substrate 10 need not be abutting the display screen 72 to be disposed over the display screen 72 but can be. As discussed above, the glass substrate 10 has the length 26 and the width 20. The width 20 extends from the first side 22 to the second side 24 of the glass substrate 10. The consumer electronic device 64 further includes the component 50 that bends the glass substrate 10 along the bend axis 46 from the first position 38 (FIG. 18) to the second position 44 (FIGS. 19 and 20). The component 50 can be a structural component, such as a cover or frame. Note that in this embodiment of the glass substrate 10, the glass substrate 10 is bent in the first position 38, and bent to become flat in the second position 44. Further note that in this embodiment of the glass substrate 10, the bend axis 46 of the glass substrate 10 is generally parallel to the width 20 of the glass substrate 10. As explained above with the analytical model, upon formation of the fracture 42 of the glass substrate 10 in the second position 44 (FIG. 21), the fracture 42 propagates generally toward either the first side 22 or the second side 24 of the glass substrate 10, which is generally parallel to the bend axis 46. Note that the fracture 42 can bifurcate 70 while still generally propagating toward either the first side 22 or the second side 24 of the glass substrate 10. It is advantageous with consumer electronic devices 52 for the fracture 42 to propagate to either the first side 22 or the second side 24 of the glass substrate 10, so that the fracture 42 terminates as quickly as possible. In addition, forcing (via bending of the glass substrate 10) the fracture 42 to propagate to the first side 22 or the second side 24 of the glass substrate 10 prevents the fracture 42 from propagating along the entire length 26 of the glass substrate 10. A user often reads text that the display screen 72 displays from left-to-right (or from right-to-left, depending on language). A fracture 42 propagating along the length 26 of the glass substrate 10 would decrease the user's ability to read such text.

As discussed above, the glass substrate 10 can be (and in this embodiment is) tempered while in the first position 38 so that the first layer 28 of compressive stress extends from the first surface 12 of the glass substrate 10 to the depth of layer (DOC) within the thickness 18 of the glass substrate 10. Further as discussed above, by bending the glass substrate 10 in this manner from the first position 38 to the second position 44, the component 50 increases the compressive stress within the first layer 28. Bending of the glass substrate 10 within the consumer electronic device 64 thus provides two benefits—forced biasing of the fracture 42 to along the bend axis 46 (and therefore to the first side 22 or the second side 24) and an increased compressive stress at the first layer 28, which can help lower the risk of the glass substrate 10 of fracturing in the first instance.

Figure 25:
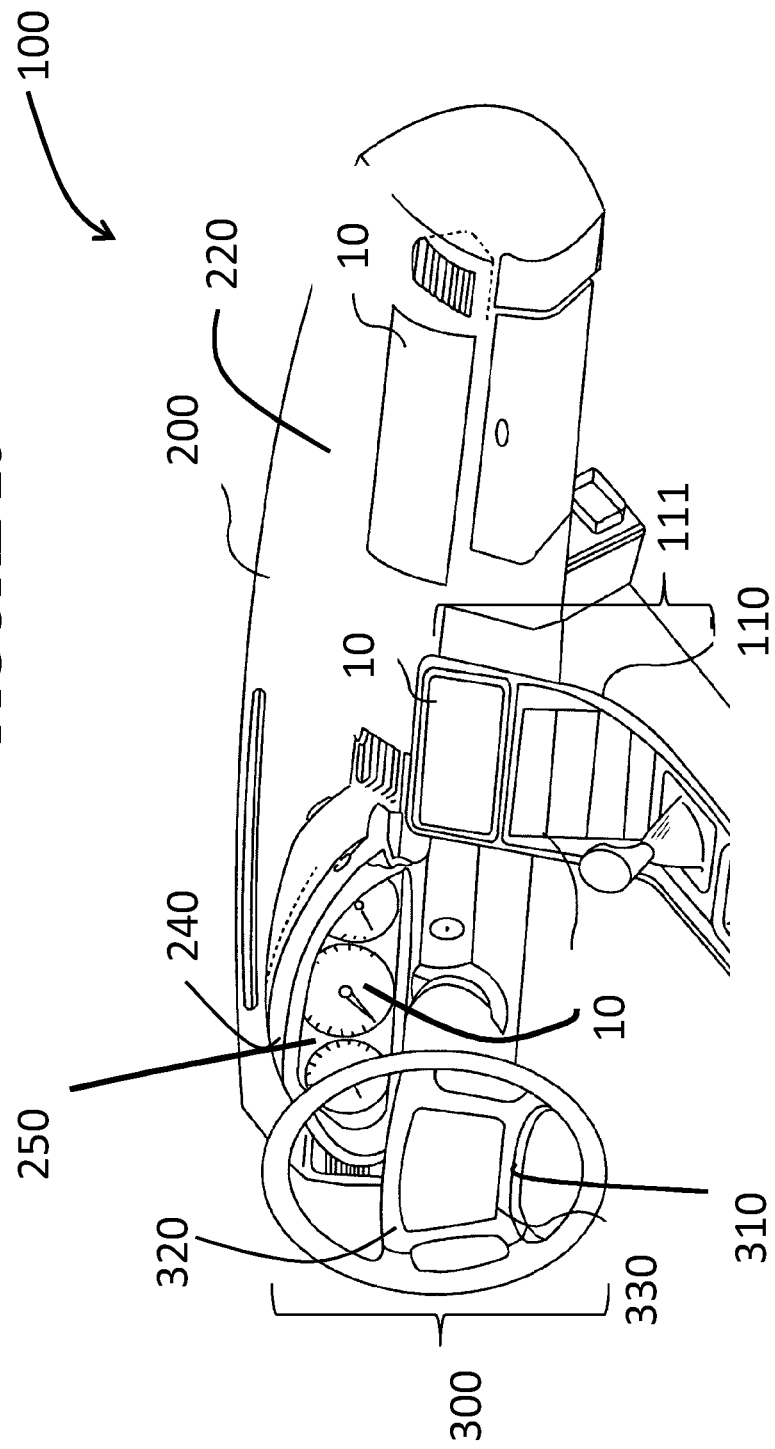
FIG. 25 is a perspective view of an automotive interior system including the glass substrate in a second position (bent).

In the illustrated embodiment, as mentioned above, the component 50 that bends the glass substrate 10 from the first position 38 to the second position 44 can be a structural component like the frame that compresses the glass substrate 10 from the first position 38 to the second position 44. Alternatively, the component 50 that causes the glass substrate 10 to bend from the first position 38 to the second position 44 can pull the glass substrate 10 to the second position 44. For example, as in the embodiment illustrated in FIGS. 22 and 23, the consumer electronic device 64 or automotive interior system (as shown in FIG. 25) can include an adhesive layer 74 that secures the glass substrate 10 in the second position 44. In other words, the component 50 that bends the glass substrate 10 from the first position 38 to the second position 44 is the adhesive layer 74. In the embodiment, the adhesive layer 74 is disposed between the glass substrate 10 and the display screen 72, with a backing plate 76 supporting the glass substrate 10 and the display screen 72. The consumer electronic device 64 can be any electronic device that the person 68 (see FIG. 24) utilizes, such as a phone 78, the watch 66, or a tablet 80. Note that in the embodiment of the watch 66, the glass substrate 10 can be non-planar (curved) in the second position 44, while in the embodiments of the phone 78 and the tablet 80, the glass substrate 10 can be planar (flat). In any event, the glass substrate 10 is bent from the first position 38 to the second position 44 during assembly of the consumer electronic device 64, to achieve the benefits described above.

Referring now to FIG. 25, the automotive interior system 100 can include a single or plurality of glass substrates 10 that are in a second position, which is curved at least uniaxially. In FIG. 24, the automotive interior system includes a center console 111 that includes two glass substrates 10 that are maintained, secured or held in a second position by a component 110. In one or more embodiments, the automotive interior system 10 includes a dashboard 200 with a curved component 220 that maintains, secures or holds the glass substrate 10 in a second position. Optionally, the instrument panel 250 also includes a component 240 that maintains, secures or holds glass substrate 10 in a second position. Steering wheel 300 of the automotive interior system 10 may include a component 320 that maintains, secures or holds glass substrate 10 in a second position. In each of these examples shown in FIG. 24, the glass substrate 10 is disposed over a display screen and/or a touch pane or touch enabled surface. As discussed above, the glass substrate 10 has the length 26 and the width 20. The width 20 extends from the first side 22 to the second side 24 of the glass substrate 10. The component in each of these embodiments can be a structural component, such as a cover or frame. The component may include an adhesive or plurality of adhesives that maintain, secure or hold the glass substrate in a second position. The automotive interior system may include an instrument panel, display, touch screen or touch-enabled surface that is disposed on a dashboard, a center console, an arm rest, a seat back, a headrest or other surface inside an automobile, seacraft, aircraft, drone or the like.

As discussed above, the glass substrate 10 can be (and in this embodiment is) tempered while in the first position 38 so that the first layer 28 of compressive stress extends from the first surface 12 of the glass substrate 10 to the depth of layer (DOC) within the thickness 18 of the glass substrate 10. Further as discussed above, by bending the glass substrate 10 in this manner from the first position 38 to the second position 44, the component 50 increases the compressive stress within the first layer 28. Bending of the glass substrate 10 within the automotive interior system 64 thus provides two benefits—forced biasing of the fracture 42 to along the bend axis 46 (and therefore to the first side 22 or the second side 24) and an increased compressive stress at the first layer 28, which can help lower the risk of the glass substrate 10 of fracturing in the first instance.

In the illustrated embodiment, as mentioned above, the component 50 that bends the glass substrate 10 from the first position 38 to the second position 44 (and maintains, secures or holds the glass substrate in the second position 44) can be a structural component like the frame and/or adhesive that compresses the glass substrate 10 from the first position 38 to the second position 44 and maintains, secures or holds the glass substrate in the second position.

Aspect (1) pertains to a glass substrate comprising: a first position, wherein a tensile stress of the glass substrate is insufficient to cause fragmentation of the glass substrate into small pieces upon fracture of the glass substrate; and a second position, wherein the glass substrate is bent relative to the first position, and wherein the tensile stress of the glass substrate is sufficient to cause fragmentation of the glass substrate into small pieces upon fracture of the glass substrate.

Aspect (2) pertains to the glass substrate of Aspect (1) further comprising: a first surface and a second surface; wherein, in the first position, the first surface and the second surface of the glass substrate are planar.

Aspect (3) pertains to the glass substrate of Aspect (1) or Aspect (2) further comprising: a first surface and a second surface; wherein, in the second position, the first surface and the second surface of the glass substrate are planar.

Aspect (4) pertains to the glass substrate of any one of Aspects (1) through (3), wherein, the small pieces are generally cubic shaped.

Aspect (5) pertains to the glass substrate of any one of Aspects (1) through (4), in the second position, the glass substrate is bent uniaxially along a bend axis of the glass substrate.

Aspect (6) pertains to the glass substrate of any one of Aspects (1) through (5), in the second position, the glass substrate is bent biaxially along two bend axes of the glass substrate.

Aspect (7) pertains to the glass substrate of any one of Aspects (1) through (6), wherein, in the first position, the glass substrate is flatter than the glass substrate is in the second position.

Aspect (8) pertains to the glass substrate of any one of Aspects (1) through (7), wherein, in the second position, the glass substrate is flatter than the glass substrate is in the first position.

Aspect (9) pertains to the glass substrate of any one of Aspects (1) through (8) further comprising: a thickness of 2 mm or less.

Aspect (10) pertains to a method of increasing compressive stress at a layer of a glass substrate comprising: providing a glass substrate; imparting a first compressive stress within a first layer from a first surface, and within a second layer from a second surface of the glass substrate; and bending the glass substrate along an axis of the glass substrate to add compressive stress to the first compressive stress within the second layer.

Aspect (11) pertains to the method of Aspect (10), wherein, imparting the first compressive stress within the first layer and the second layer of the glass substrate includes thermal tempering, mechanical tempering or chemical tempering of the glass substrate.

Aspect (12) pertains to the method of Aspect (10) or Aspect (11), wherein, imparting the first compressive stress within the first layer and within the second layer of the glass substrate includes chemical tempering of the glass substrate.

Aspect (13) pertains to the glass substrate of any one of Aspects (10) through (12), wherein, the second surface of the glass substrate is a top surface of the glass substrate.

Aspect (14) pertains to a method of reducing the size of the pieces that a glass substrate fragments into upon fracture of the glass substrate comprising: providing a glass substrate that fragments into pieces having a first size upon fracture of the glass substrate; and bending the glass substrate to a second position and maintaining the glass substrate in the second position, such that when the glass substrate fragments into pieces having a second size upon fracture of the glass substrate; wherein, the pieces having the second size are smaller than the pieces having the first size.

Aspect (15) pertains to the method of Aspect (14), wherein, forming the glass substrate includes forming the glass substrate with a thickness of 2 mm or less.

Aspect (16) pertains to the method of Aspect (14) or Aspect (15), wherein, bending the glass substrate includes biaxial bending of the glass substrate.

Aspect (17) pertains to the method of Aspect (16), wherein, when the glass substrate fragments, in the second position, upon fracture of the glass substrate, the pieces form an in-plane isotropic fracture pattern.

Aspect (18) pertains to the method of any one of Aspects (14) through (17), wherein, bending the glass substrate includes uniaxial bending of the glass substrate along a bend axis of the glass substrate.

Aspect (19) pertains to the method of any one of Aspects (14) through (18), wherein, forming the glass substrate includes forming the glass substrate with a first surface that is flat.

Aspect (20) pertains to the method of any one of Aspects (14) through (19), wherein, forming the glass substrate includes forming the glass substrate with a first surface that is curved; and wherein, bending the glass substrate to the second position includes bending the glass substrate so that the first surface is less curved in the second position than in the first position.

Aspect (21) pertains to the method of any one of Aspects (14) through (20), wherein, bending and maintaining the glass substrate in the second position is achieved at ambient temperature by a structural component of a product that utilizes the glass substrate.

Aspect (22) pertains to a product comprising: a glass substrate having a first position, wherein a tensile energy of the glass substrate is insufficient to cause fragmentation of the glass substrate into small pieces upon fracture of the glass substrate; and a component that bends the glass substrate away from its first position to a second position, wherein the tensile energy of the glass substrate is sufficient to cause fragmentation of the glass substrate into small pieces upon fracture of the glass substrate.

Aspect (23) pertains to the product of Aspect (22), wherein, the product is a consumer electronic device that is configured to be worn on a wrist of a person.

Aspect (24) pertains to the product of Aspect (22), wherein, the product is safety glass.

Aspect (25) pertains to the product of Aspect (22), wherein, the product is an automotive interior cover glass system.

Aspect (26) pertains to the product of any one of Aspects (22) through (24), wherein, the glass substrate has a first surface and a second surface; and wherein, in the second position, the first surface has a higher compressive stress than the second surface.

Aspect (27) pertains to a consumer or automotive interior electronic device comprising: a glass substrate disposed over a display screen, the glass substrate having a length, and a width extending from a first side to a second side; and a component that bends the glass substrate along a bend axis from a first position to a second position bent relative to the first position, such that upon fracture of the glass substrate in the second position, the fracture propagates generally toward the first side or the second side of the glass substrate; wherein, the bend axis is generally parallel to the width of the glass substrate.

Aspect (28) pertains to the product of Aspect (27), wherein, in the first position, the glass substrate has a first layer of compressive stress extending from a first surface; and wherein, the component that bends the glass substrate to the second position increases the compressive stress within the first layer.

Aspect (29) pertains to the consumer or automotive interior electronic device of Aspect (27) or Aspect (28), wherein, the component that bends the glass substrate compresses the glass substrate from the first position to the second position.

Aspect (30) pertains to the consumer or automotive interior electronic device of any one of Aspects (27) through (29), wherein, the component that bends the glass substrate is an adhesive layer.

Aspect (31) pertains to the consumer or automotive interior electronic device of any one of Aspects (27) through (30), wherein the consumer electronic device is a smart phone, tablet, a watch or automotive display.

Aspect (32) pertains to a product comprising: a glass substrate having a first position, wherein a tensile energy of the glass substrate is insufficient to cause fragmentation of the glass substrate into small pieces upon fracture of the glass substrate; and a component that bends and maintains the glass substrate in a second position, wherein the tensile energy of the glass substrate is sufficient to cause fragmentation of the glass substrate into small pieces upon fracture of the glass substrate.

Aspect (33) pertains to the product of Aspect (32), wherein, the product is a consumer electronic device that is configured to be worn on a wrist of a person.

Aspect (34) pertains to the product of Aspect (32), wherein, the product is safety glass.

Aspect (35) pertains to the product of Aspect (32), wherein, the product is an automotive interior cover glass system.

Aspect (36) pertains to the product of any one of Aspects (32) through (35), wherein, the glass substrate has a first surface and a second surface; and wherein, in the second position, the first surface has a higher compressive stress than the second surface.

Aspect (37) pertains to a consumer or automotive interior electronic device comprising: a glass substrate disposed over a display screen, the glass substrate having a length, and a width extending from a first side to a second side; and a component that bends and maintains the glass substrate along a bend axis from a first position in a second position bent relative to the first position, such that upon fracture of the glass substrate in the second position, the fracture propagates generally toward the first side or the second side of the glass substrate; wherein, the bend axis is generally parallel to the width of the glass substrate.

Aspect (38) pertains to the consumer or automotive interior electronic device of Aspect (37) wherein, in the first position, the glass substrate has a first layer of compressive stress extending from a first surface; and wherein, the component that bends the glass substrate to the second position increases the compressive stress within the first layer.

Aspect (39) pertains to the consumer or automotive interior electronic device of Aspect (37) or Aspect (38) wherein, the component that bends the glass substrate compresses the glass substrate from the first position to the second position.

Aspect (40) pertains to the consumer or automotive interior electronic device of any one of Aspects (37) through (39), wherein, the component that bends the glass substrate is an adhesive layer.

Aspect (40) pertains to the consumer or automotive interior electronic device of any one of Aspects (37) through (40), wherein the consumer electronic device is a smart phone, tablet, a watch or an automotive display.

It will be apparent to those skilled in the art that various modifications and variations can be made without departing from the spirit or scope of the claims.

What is claimed is:

1. A glass substrate comprising:
   a first position, wherein a tensile stress of the glass substrate is insufficient to cause fragmentation of the glass substrate into small pieces upon fracture of the glass substrate; and
   a second position, wherein the glass substrate is bent relative to the first position, and wherein the tensile stress of the glass substrate is sufficient to cause fragmentation of the glass substrate into small pieces upon fracture of the glass substrate.

2. The glass substrate of claim 1,
   a first surface and a second surface;
   wherein, in the first position, the first surface and the second surface of the glass substrate are planar.

3. The glass substrate of claim 1, a first surface and a second surface;
   wherein, in the second position, the first surface and the second surface of the glass substrate are planar.

4. The glass substrate of claim 1,
   wherein, the small pieces are generally cubic shaped.

5. The glass substrate of claim 1,
   in the second position, the glass substrate is bent uniaxially along a bend axis of the glass substrate.

6. The glass substrate of claim 1,
   in the second position, the glass substrate is bent biaxially along two bend axes of the glass substrate.

7. The glass substrate of claim 1,
   wherein, in the first position, the glass substrate is flatter than the glass substrate is in the second position.

8. The glass substrate of claim 1, wherein, in the second position, the glass substrate is flatter than the glass substrate is in the first position.

9. The glass substrate of claim 1, further comprising:
   a thickness of 2 mm or less.

10. A product comprising:
    a glass substrate having a first position, wherein a tensile energy of the glass substrate is insufficient to cause fragmentation of the glass substrate into small pieces upon fracture of the glass substrate; and
    a component that bends and maintains the glass substrate in a second position, wherein the tensile energy of the glass substrate is sufficient to cause fragmentation of the glass substrate into small pieces upon fracture of the glass substrate.

11. The product of claim 10, wherein, the product is a consumer electronic device that is configured to be worn on a wrist of a person.

12. The product of claim 10, wherein, the product is safety glass.

13. The product of claim 10, wherein, the product is an automotive interior cover glass system.

14. The product of claim 10:
wherein, the glass substrate has a first surface and a second surface; and
wherein, in the second position, the first surface has a higher compressive stress than the second surface.

* * * * *